United States Patent [19]

Schoenig, Jr. et al.

[11] Patent Number: 4,980,119
[45] Date of Patent: Dec. 25, 1990

[54] MULTIZONE AUTOMATED NUCLEAR FUEL ROD LOADING SYSTEM

[75] Inventors: Frederick C. Schoenig, Jr.; David G. Tashjian; Archie C. Lamb; Barry S. Guilliams, all of Wilmington, N.C.; George W. Tunnell, Foster City; Edward W. Meeka, Pleasanton, both of Calif.

[73] Assignee: General Electric Company, San Jose, Calif.

[21] Appl. No.: 503,079

[22] Filed: Apr. 3, 1990

Related U.S. Application Data

[63] Continuation of co-pending application Ser. No. 333,150, Apr. 4, 1989, now abandoned.

[51] Int. Cl.⁵ .............................. G21C 21/00
[52] U.S. Cl. ........................ 376/261; 53/542
[58] Field of Search ............ 376/261, 260; 53/154, 53/237, 244, 247, 502, 525, 542; 29/723, 906, 711, 786, 791, 793, 821, 822; 414/146

[56] References Cited

U.S. PATENT DOCUMENTS

| | | | |
|---|---|---|---|
| 3,735,550 | 5/1973 | Moore et al. | 53/22 R |
| 3,746,190 | 7/1973 | Hotz | 214/34 |
| 3,940,908 | 3/1976 | Dazen et al. | 53/59 R |
| 3,965,648 | 6/1976 | Tedesco | 53/126 |
| 4,158,601 | 6/1979 | Gerkey | 376/261 |
| 4,235,066 | 11/1980 | King et al. | 53/500 |
| 4,243,078 | 1/1981 | Sahlin | 141/1 |
| 4,680,920 | 7/1987 | Vere et al. | 53/525 |
| 4,687,605 | 8/1987 | Cellier et al. | 252/636 |
| 4,700,824 | 10/1987 | Vere et al. | 198/346.2 |
| 4,748,798 | 6/1988 | Udaka et al. | 53/504 |
| 4,842,808 | 6/1989 | Rieben et al. | 376/261 |

Primary Examiner—Daniel D. Wasil
Attorney, Agent, or Firm—Robert R. Schroeder

[57] ABSTRACT

Pellet trays bearing rows of fuel pellets of known enrichment concentrations are retrieved from selected storage elevators and successively conveyed to a zone makeup machine. Parallel rows of pellets are raked from each tray and advanced over a longitudinally elongated, grooved loading surface into abutment with a selectively longitudinally positioned stop. A zone makeup carriage makes up the pellet rows to a prescribed, common zone length, which are then weighted and advanced in parallel by a vibratory loader into a plurality of cladding tubes arranged in parallel loading positions by tube handling apparatus. Overall operation is coordinated by a system controller to concurrently load the cladding tubes with multiple pellet zones of varying enrichments and lengths in automated fashion.

51 Claims, 24 Drawing Sheets

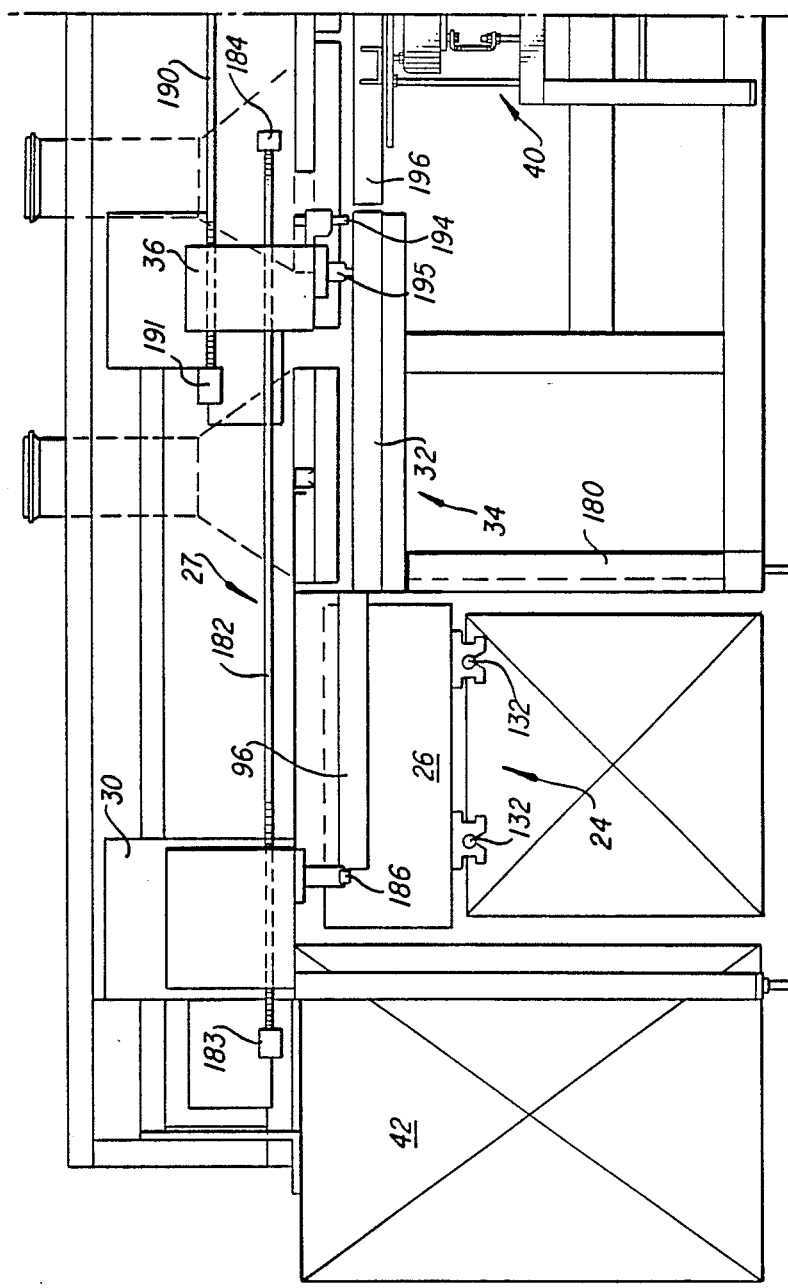

| FIG.17a | FIG.17b |

MULTIZONE AUTOMATED NUCLEAR FUEL ROD LOADING SYSTEM

This is a continuation of co-pending application Ser. No. 07/333,150 filed on April 4, 1989, now abandoned.

The present invention relates to the manufacture of nuclear fuel rods utilized in reactor cores and particularly to apparatus for loading fuel pellets into cladding tubes.

BACKGROUND OF THE INVENTION

The core of a typical nuclear reactor may include 40,000 or more fuel rods, each containing a column of hundreds of fuel pellets. The fuel rods are arranged to generate controlled amounts of heat in specific regions of the core. Controlled heat generation is largely achieved by organizing the pellet columns in specified zones of varying lengths and uranium enrichment concentrations. Current designs call for fuel rods having as many as seven pellet zones of various specified lengths and four or more different enrichment concentrations.

Proper operation of a reactor critically depends not only on the locations of the various types of fuel rods within the core, but also on the locations of the various pellet zones of specified enrichments in the pellet column of each fuel rod. Thus, to assure requisite control of the heat generated in a reactor core such as to decrease local power peaking, to improve the power distribution throughout the bundles of fuel rods, and to provide adequate reactor shutdown margin, it is critical that the fuel rods be manufactured strictly in accordance with engineering specifications to comply with safety and regulatory requirements. Thus, each and every fuel pellet must be in a prescribed location within the pellet column according to enrichment concentration in order to achieve requisite enrichment zone lengths and zone interface positions along the column length.

As the number of enrichment zones per pellet column increases, so does the potential for manufacturing error. Thus more rigorous quality assurance measures must be instituted. Pellets of different enrichments must be maintained segregated, tracked and accounted for throughout the loading process. Each pellet enrichment zone must be precisely made up to exacting length and weight specifications and loaded into a fuel rod or cladding tube in the proper order to assure its requisite positioning in the pellet column. That is, the fuel rod must be loaded by pellet zones in accordance with predetermined engineering specifications or so-called "rod maps". Another quality assurance check is the vacant space left in the cladding tube after the last pellet zone has been loaded, which ultimately provides a plenum chamber when the tube is sealed with an end plug as the final fuel rod manufacturing step. A record must be kept of the specifications to which each rod was loaded with pellets so that the rods can be assembled into fuel bundles in proper positions.

The vast multitude of fuel pellets and the lesser but still significant number of cladding tubes to be handled and brought together, coupled with the required quality assurance checks and record keeping, makes for an involved and time consuming loading process. Consequently, the requisite fuel rod output to satisfy the needs of the nuclear power generating industry is a major concern. Manual pellet loading is too labor intensive, slow and prone to error. Automated apparatuses have been proposed and utilized to load nuclear fuel pellets into cladding tubes as evidenced by U.S. Pat. Nos. 3,735,550; 3,746,190; 3,940,908; 4,158,601; 4,235,066 and 4,243,078. However, while these apparatuses serve to automate the step of loading rows of pellets into cladding tubes, they are not equipped to fully automate the handling of the pellets and cladding tubes preparatory to the actual loading step and the handling of the cladding tubes after they have been loaded. Thus considerable human participation is required in the overall pellet loading process. The potential for production error therefore remains. Moreover, prior art pellet loading apparatuses are not equipped to automatically perform all of the quality control checks required to ensure that the cladding tubes have been loaded precisely to design specifications. Finally, the rate at which prior art apparatuses can reliably and accurately load cladding tubes with pellet columns consisting of multiple pellet zones of different enrichments and lengths is less than satisfactory.

It is accordingly an object of the present invention to provide an automated system for loading nuclear fuel rods or cladding tubes with fuel pellets.

An additional object is to provide a pellet loading system of the above-character which is capable of automatically making up multiple pellet zones of different enrichments and lengths for loading into cladding tubes.

Another object is to provide a pellet loading system of the above-character, wherein the handlings of the multiplicities of fuel pellets and cladding tubes preparatory and subsequent to loading are automated.

A further object is to provide a pellet loading system of the above-character, wherein automated quality control checks are performed at strategic points throughout the manufacturing process to assure absolute production integrity.

Yet another object is to provide a pellet loading system of the above-character, wherein data is gathered to track the movements of the particular types of fuel pellets and the individual cladding tubes through the system to create a record of what pellets were loaded into which tube.

A still further object is to provide a pellet loading system of the above-character wherein multiple cladding tubes are loaded in parallel to enable a high rate of throughput.

Other objects of the invention will in part be obvious and in part appear hereinafter.

SUMMARY OF THE INVENTION

In accordance with the present invention, there is provided an automated system for loading multiple enrichment zones of nuclear fuel pellets into cladding tubes pursuant to the manufacture of nuclear fuel rods. To this end, the system includes a plurality of storage units in which trays of fuel pellets are separately stored in accordance with their enrichment concentrations. These storage units are served by a conveyor equipped with at least one trolley onto which a pellet tray retrieved from a selected storage unit is automatically placed for conveyance to the input station of a zone makeup machine.

The system also includes automated cladding tube handling apparatus for concurrently transferring plural cladding tubes from an input tube tray to an input queue, from which they are singulated for individual transfer to an optical character reader where a unique serial number borne by the endplug affixed to one end of each tube is read. From the reader, the cladding tubes are accumulated in a loading buffer and then transferred en masse to a vibratory loader where they are located in parallel, spaced pellet loading positions with respect to a bushing assembly situated at the interface between the zone makeup machine and the tube handling apparatus.

The zone makeup machine is controlled to rake multiple rows of pellets from a tray presented thereto by the trolley conveyor. These pellet rows are advanced along grooves formed in a longitudinally elongated loading table into abutment with a retractable stop selectively longitudinally positioned in accordance with the specified length of the pellet zones to be loaded into the cladding tubes waiting in their pellet loading positions. The zone makeup machine then creates gaps in the pellet rows at points approximating the specified zone length and excess pellets in each row are backed off to a staging area on the table. A precise measurement is then concurrently made for the length of each pellet row backed up against the stop. If necessary, individual pellets are removed or added to these pellet rows until the row lengths come within specified zone length tolerance limits. Excess pellets are raked back onto the tray waiting at the input station for conveyance back to the particular storage unit from which it was retrieved.

The pellet rows measured to the specified zone length are then weighed, and, upon retraction of the stop, are advanced to the vibratory loader. Upon activation of this loader, the length-measured and weighed pellet rows are advanced through the bushing assembly and into the open ends of the plural cladding tubes situated in their pellet loading positions. This procedure is repeated on a pellet zone by pellet zone basis until all the cladding tubes have been fully loaded with pellets. The zone makeup machine then automatically performs a plenum chamber length check by concurrently measuring the distances between the last pellet of the pellet column within each tube and the tube end. The handling apparatus then transfers the loaded and plenum chamber length checked cladding tubes from the vibratory loader to an output buffer where they are automatically sorted into accepted and suspect lots.

Operation of the system is controlled by a system controller linked with various process controllers acting automatically in concert to concurrently load groups of cladding tubes in batch fashion with multiple pellet zones of different enrichment concentrations and of different zone lengths. The loading process is automatically conducted in accordance with engineering specifications entered into the computer, and a production record identifying each tube and the design specifications to which it was in fact loaded is compiled by the computer. The system is structured to effect the loading process on an expedited, mass production basis and is equipped with numerous safeguards against manufacturing errors.

The invention accordingly comprises the features of construction, combination of elements, and arrangement of parts, all of which will be exemplified in the construction hereinafter set forth, and the scope of the invention will be indicated in the appended claims.

For a full understanding of the nature and objects of the present invention, reference may be had to the following Detailed Description taken in conjunction with the accompanying drawings, in which.

Figure 1:
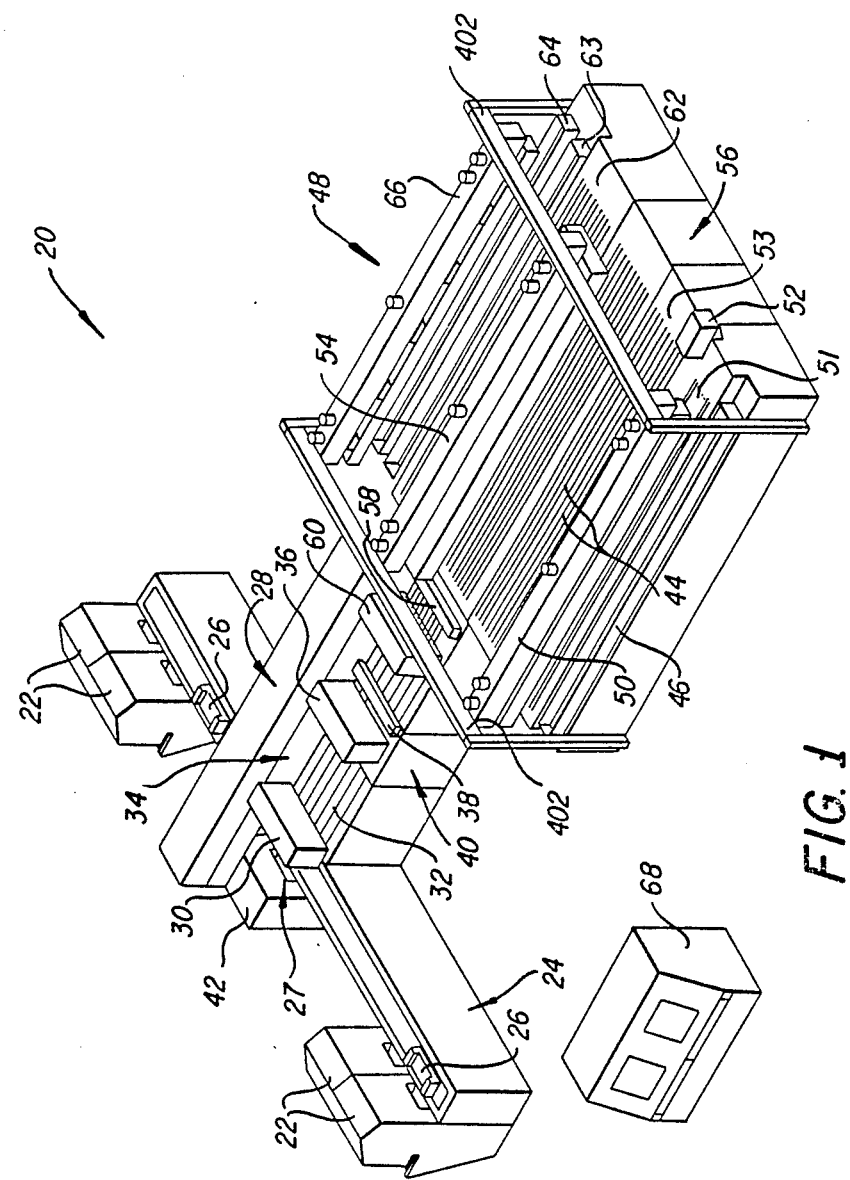
FIG. 1 is an overall perspective view of a multizone automated nuclear fuel rod loading system constructed in accordance with the present invention.
Figure 6B:
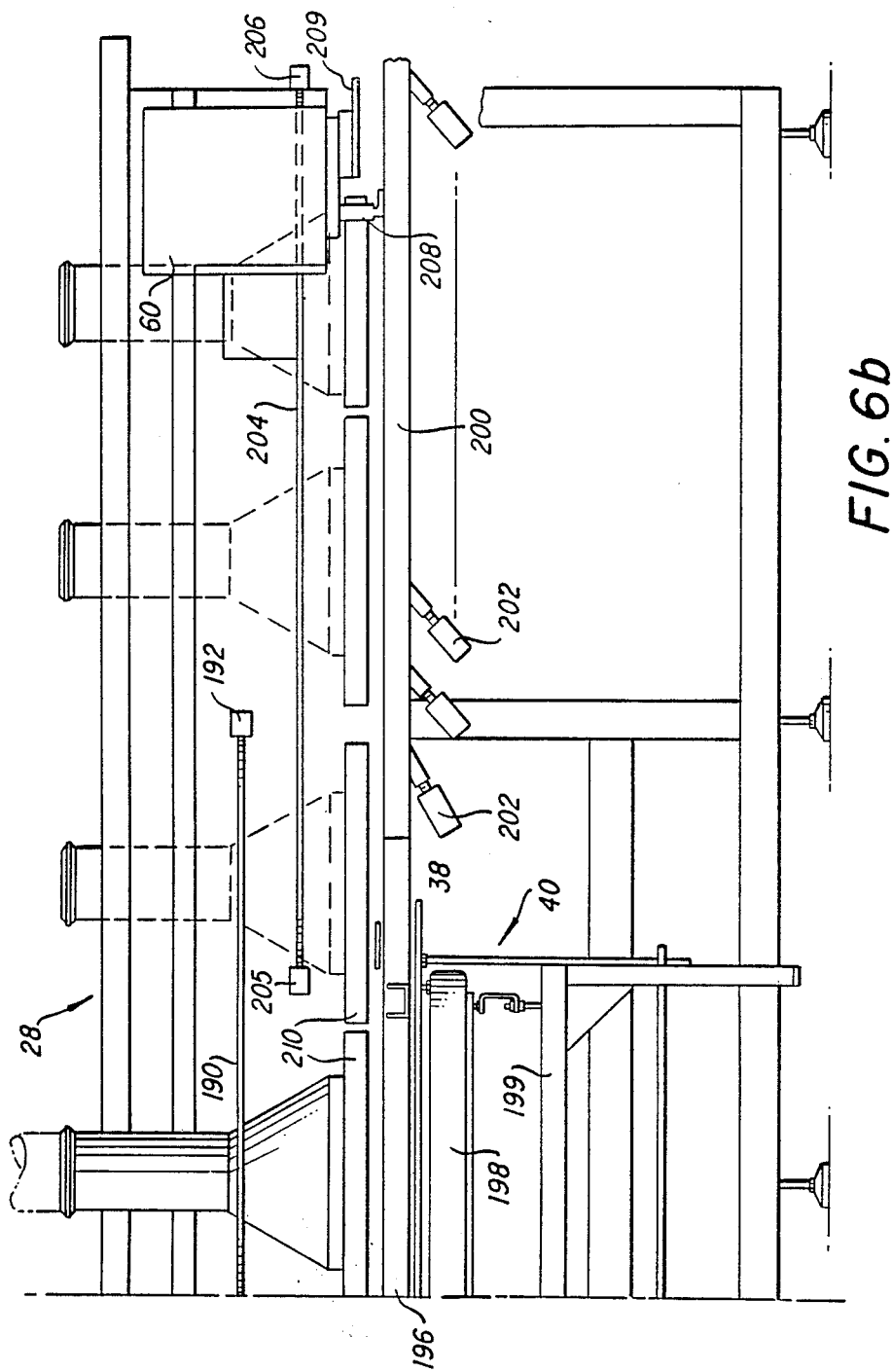
Figure 7:
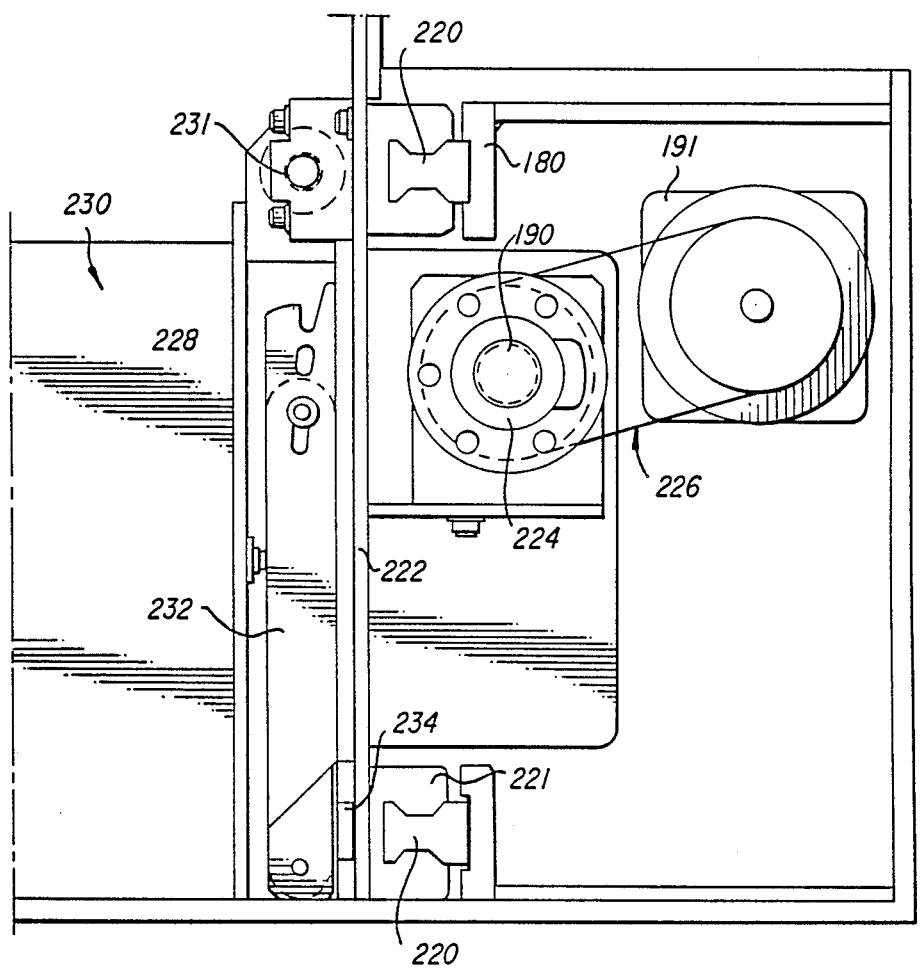
Figure 8:
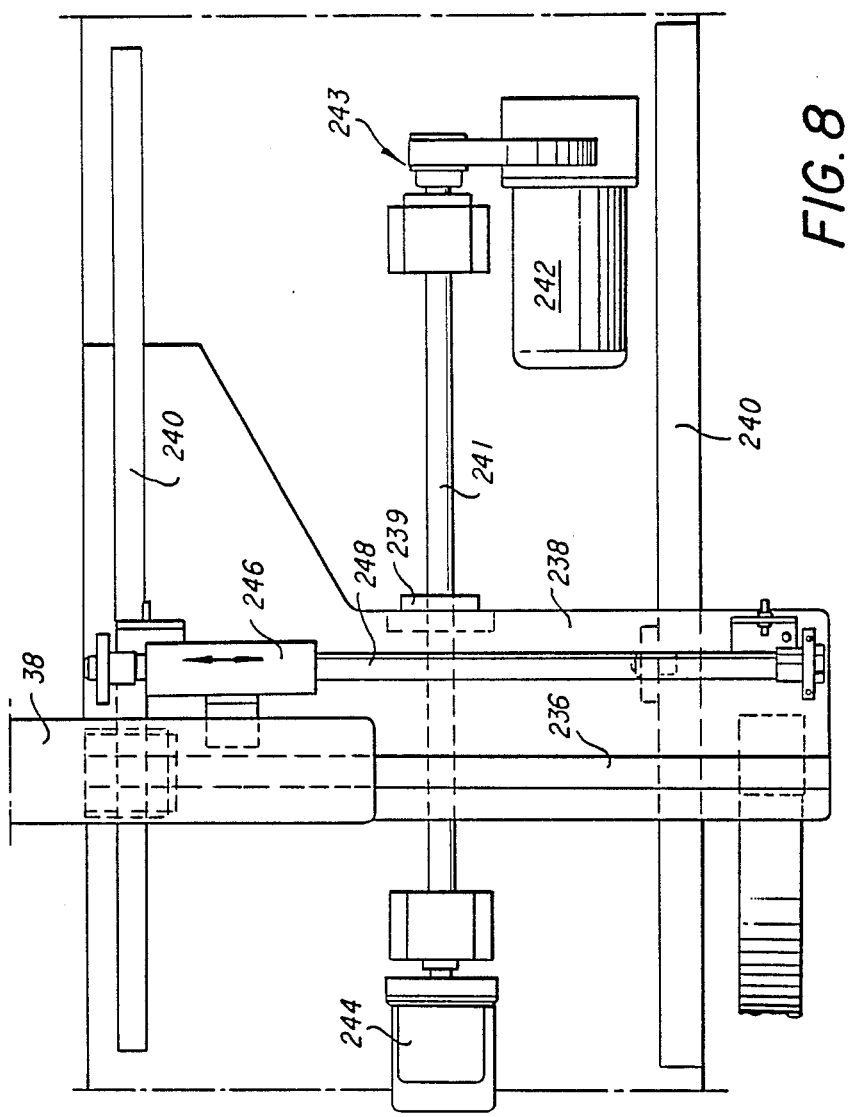
Figure 9:
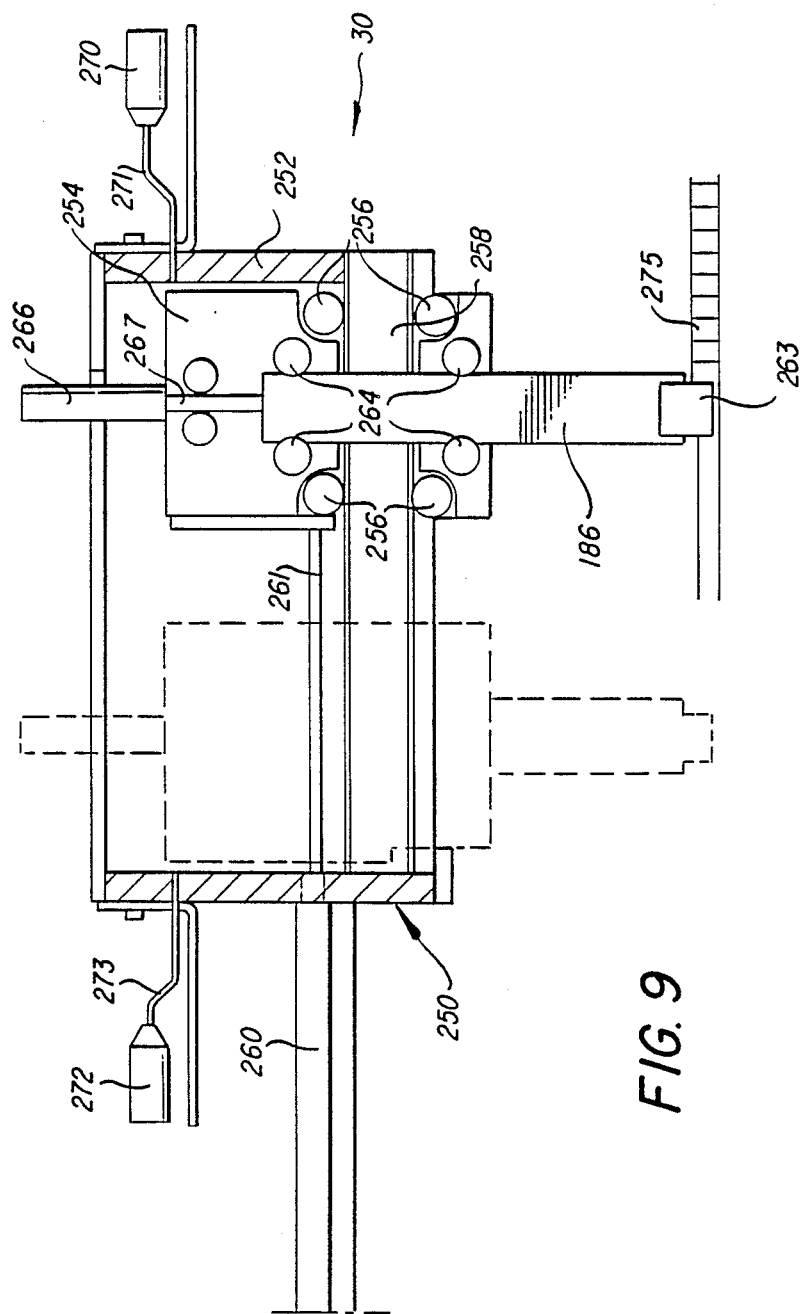
Figure 10:
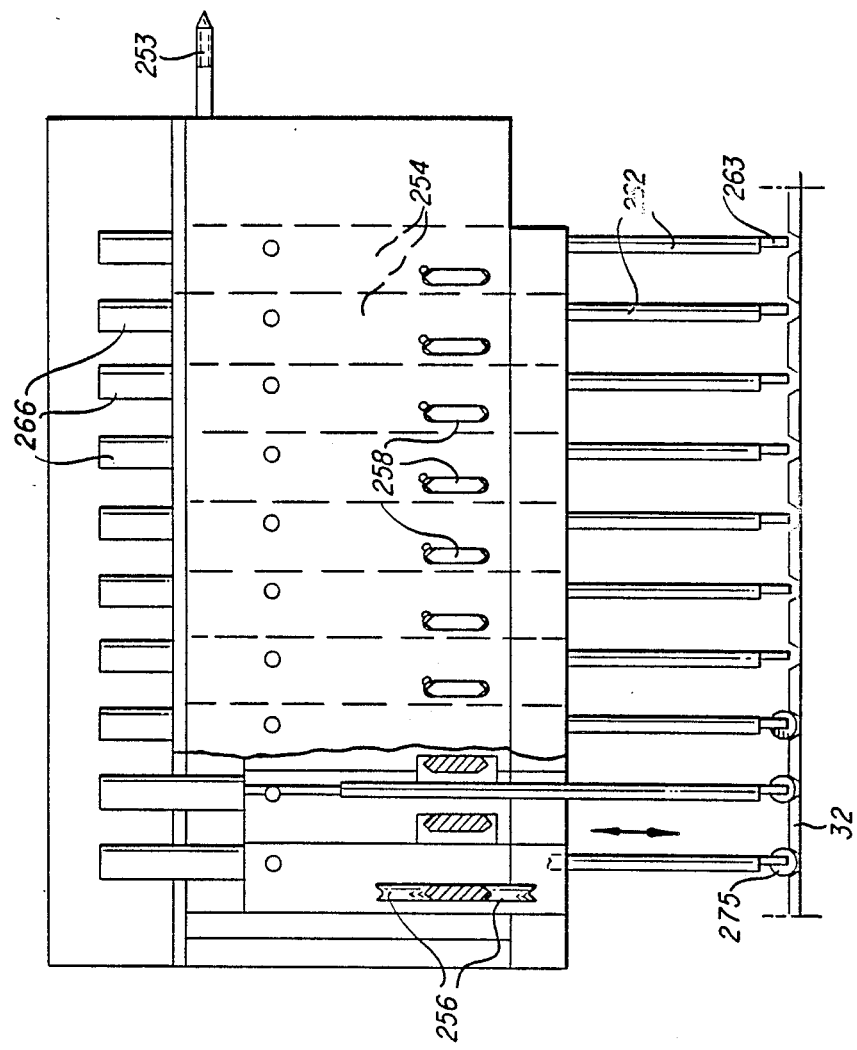
Figure 11:
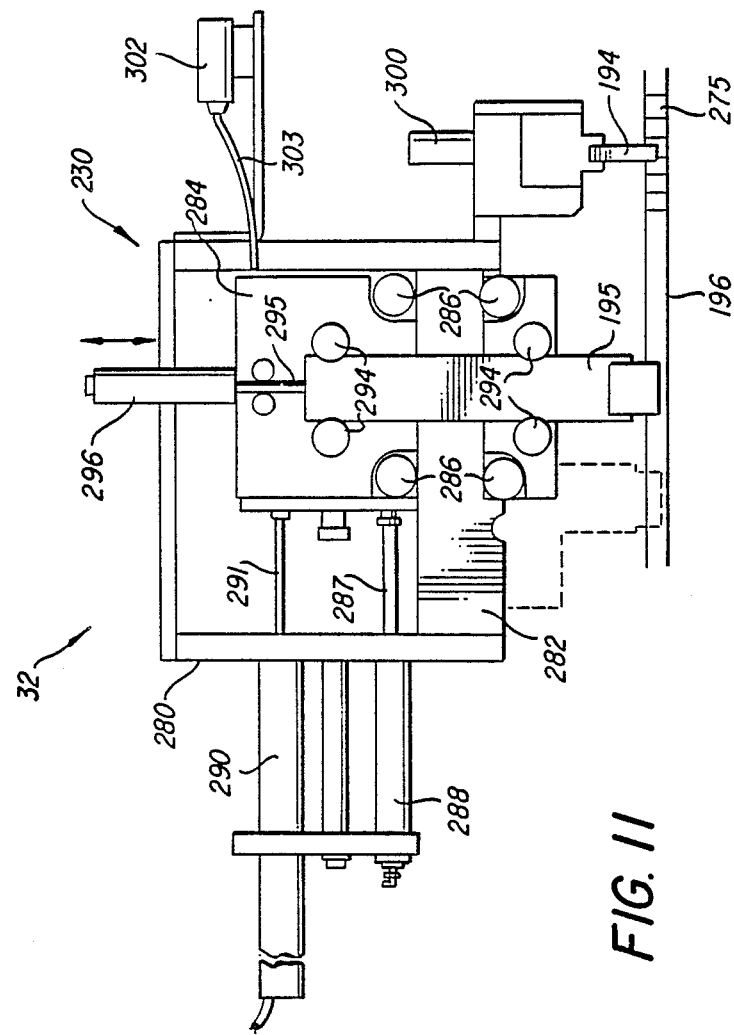
Figure 12:
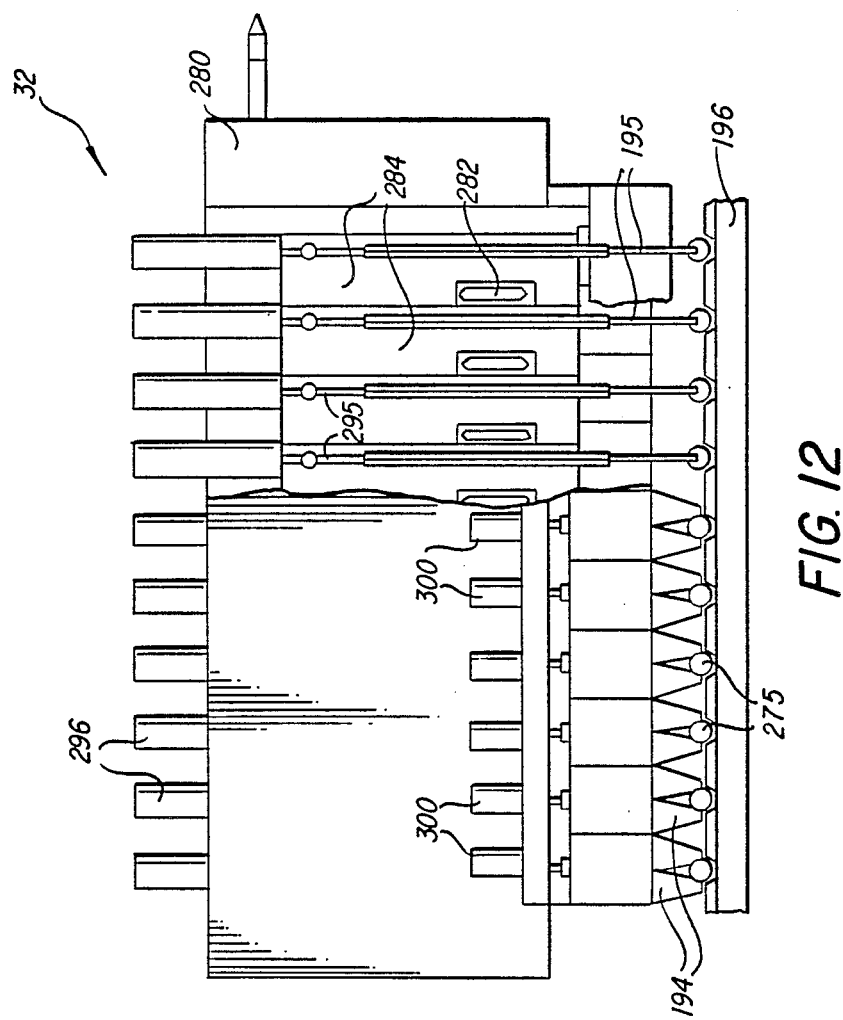
Figure 13:
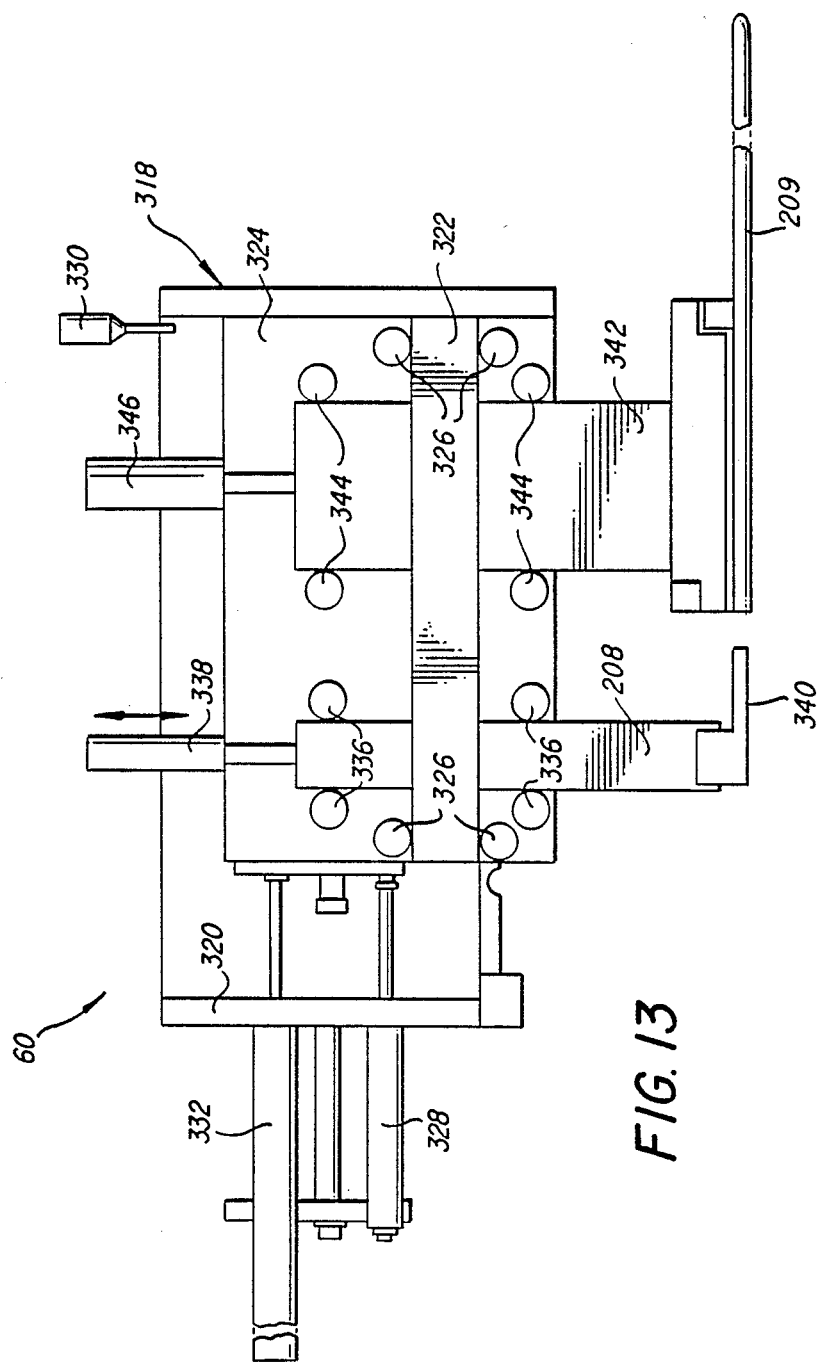
Figure 14:
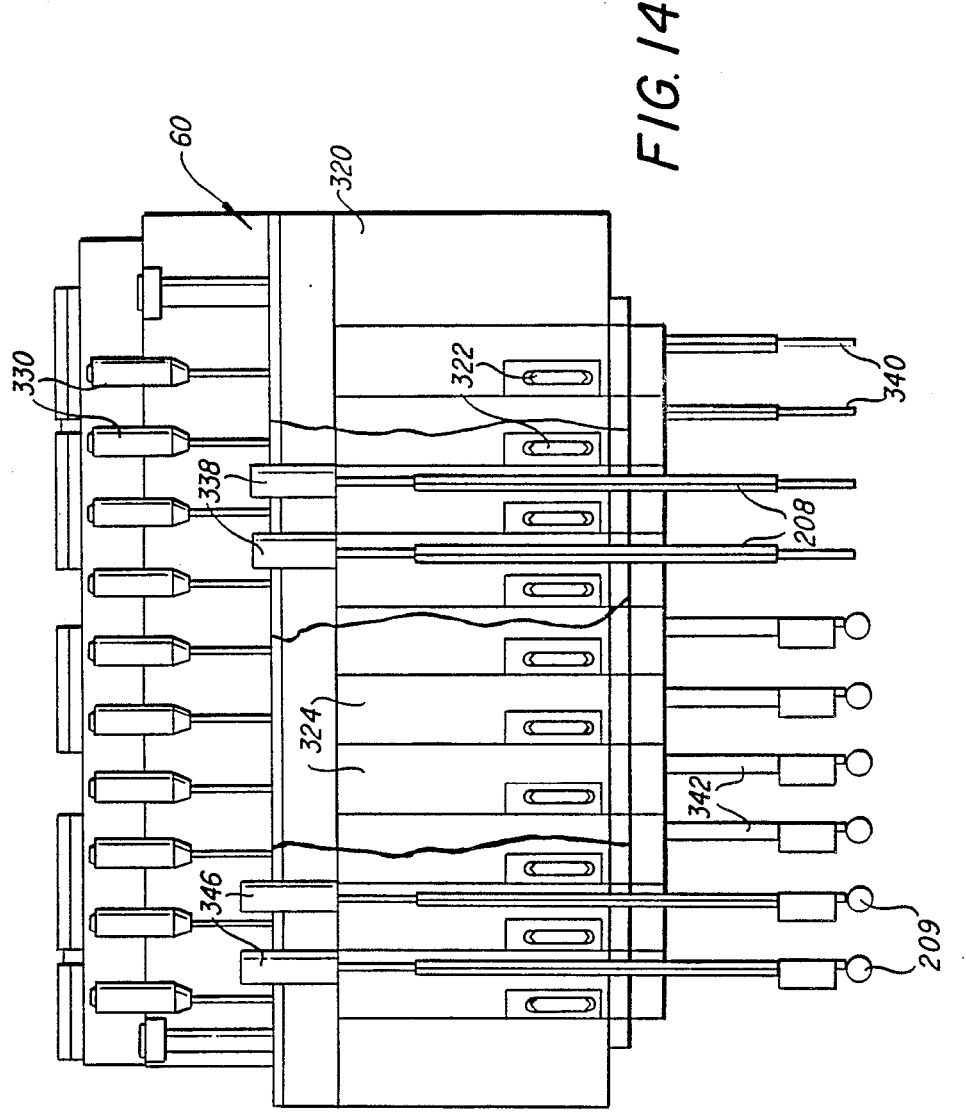
Figure 15:
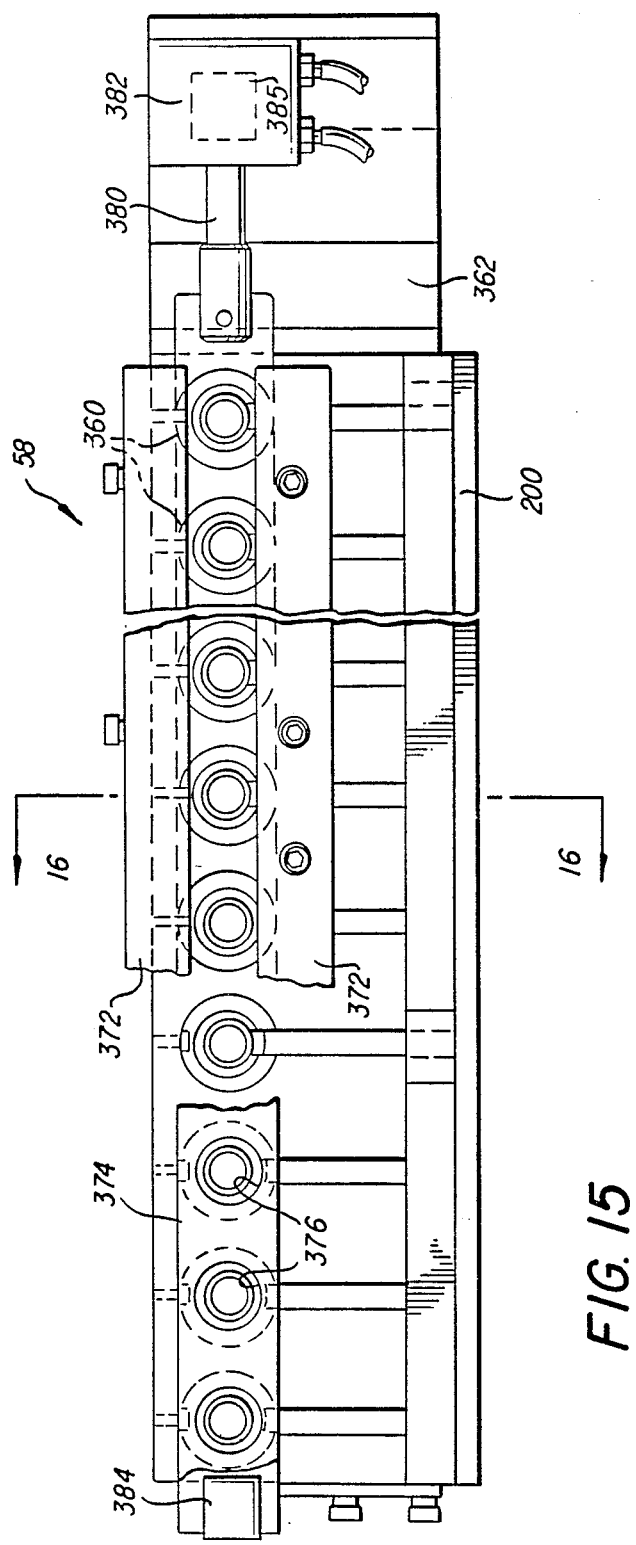
Figure 16:
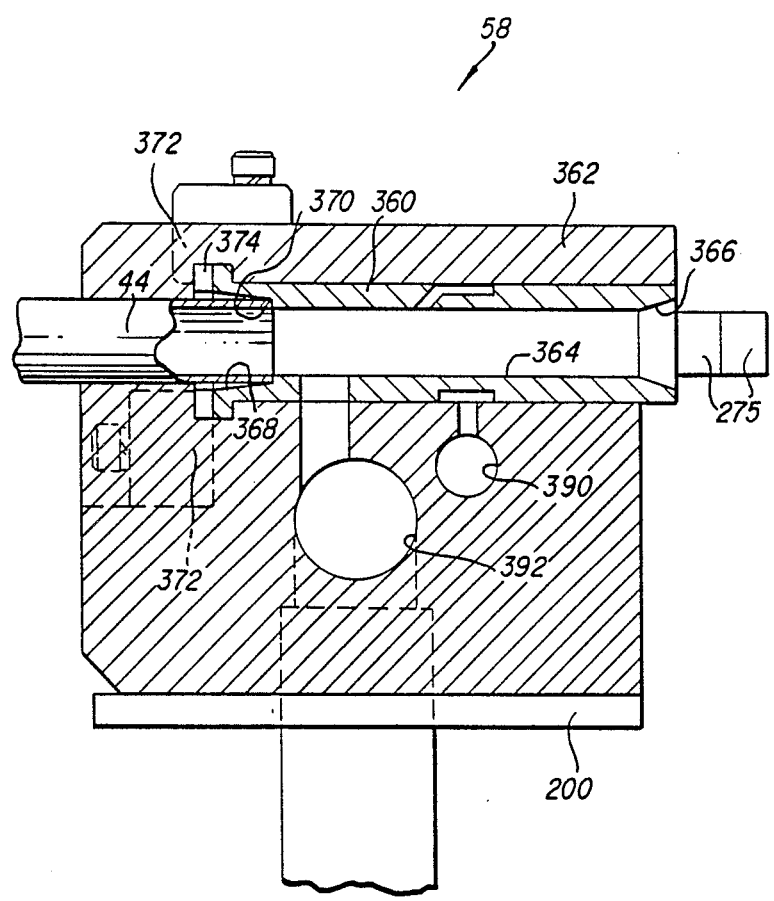
Figures 17, 17A:
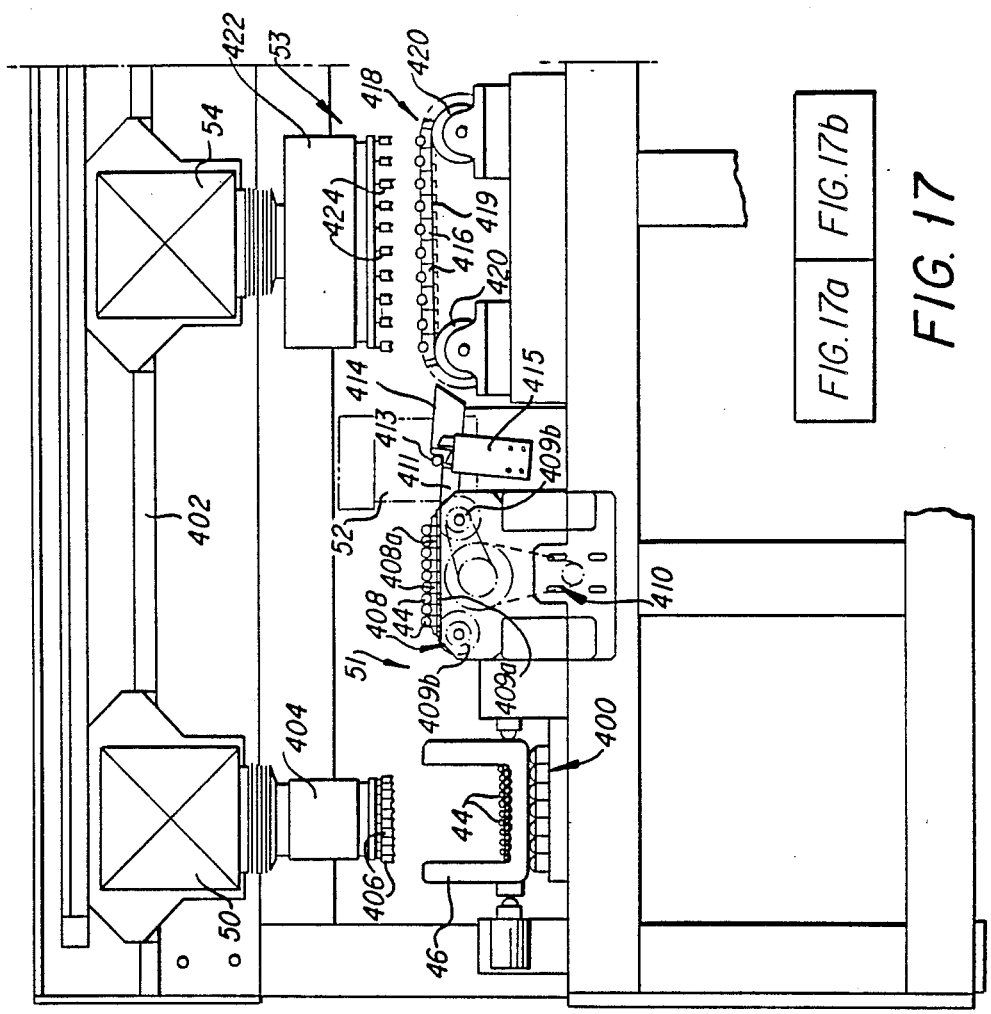
Figure 17B:
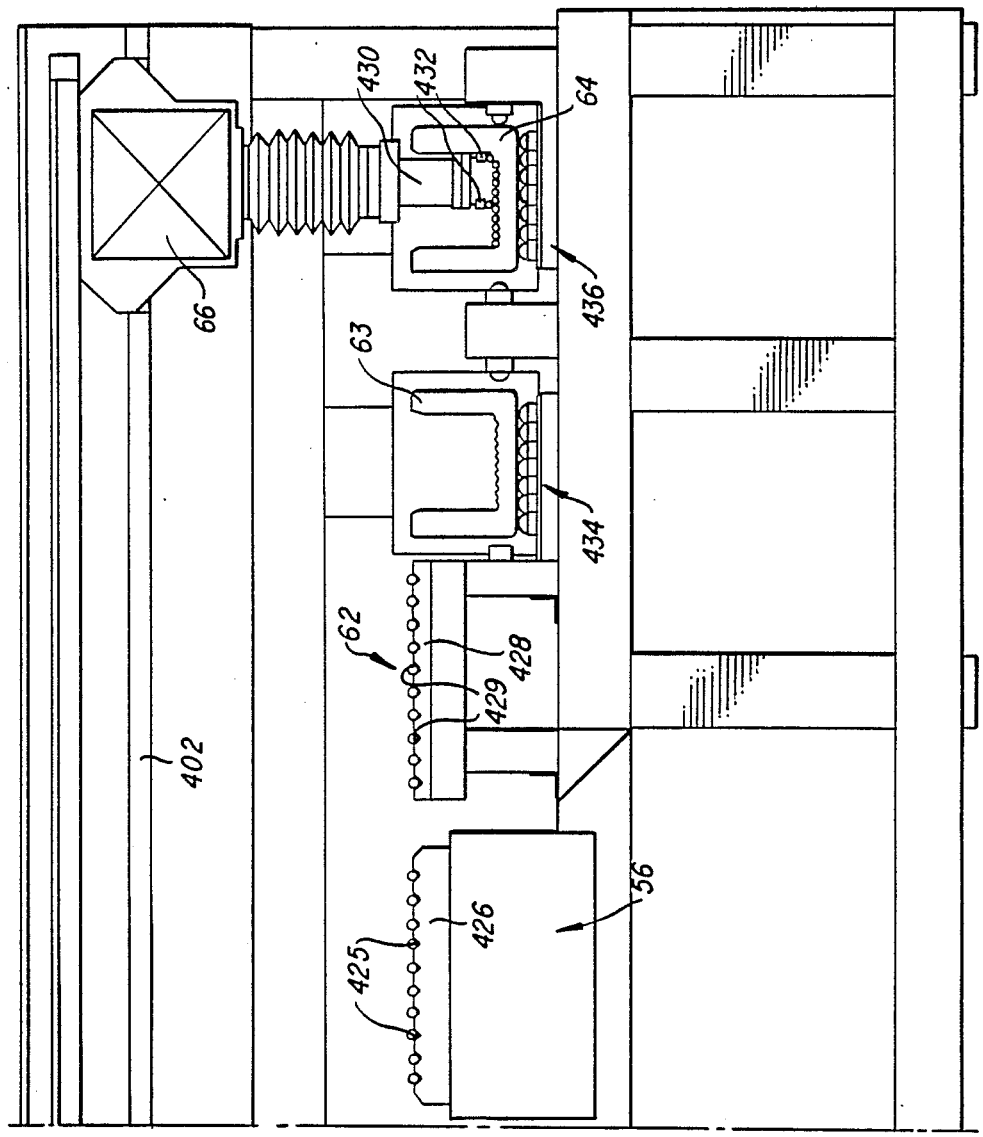
Figure 18:
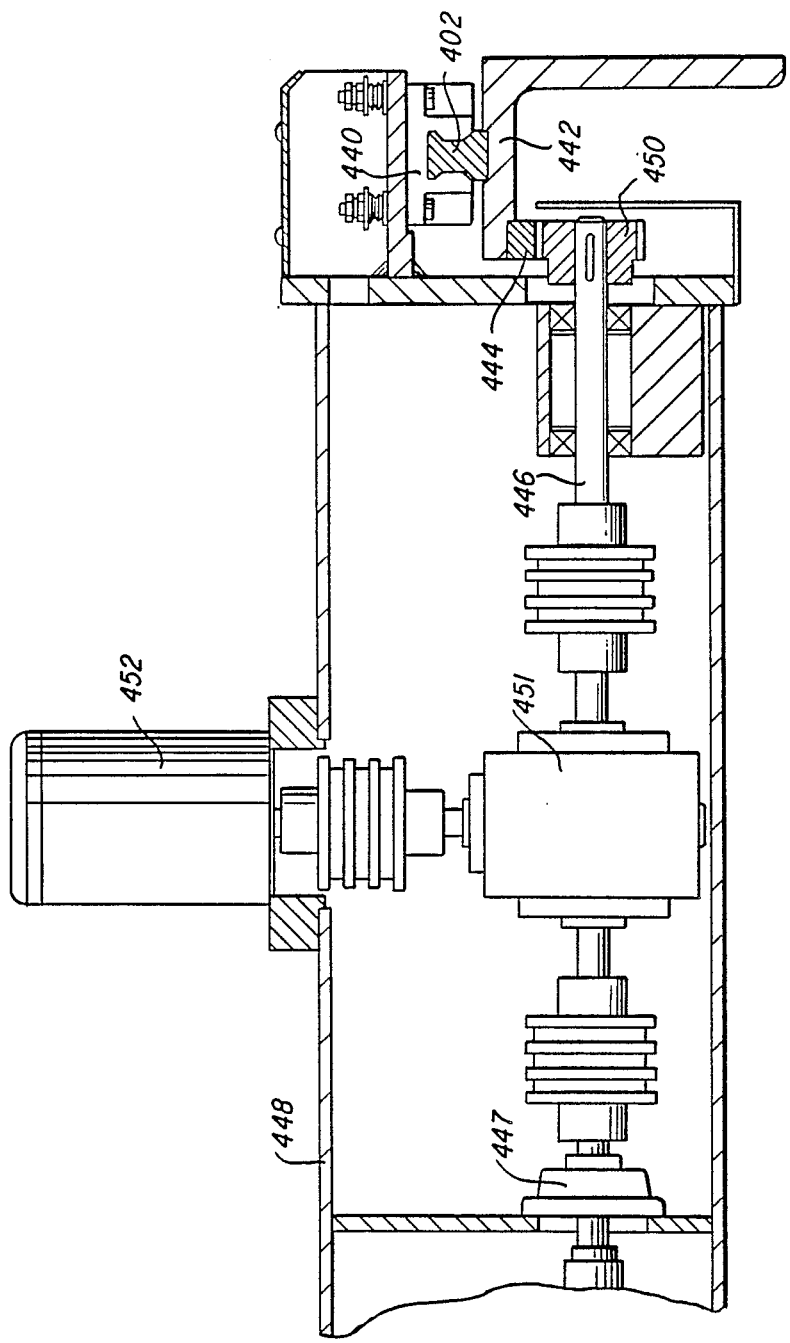
Figure 19:
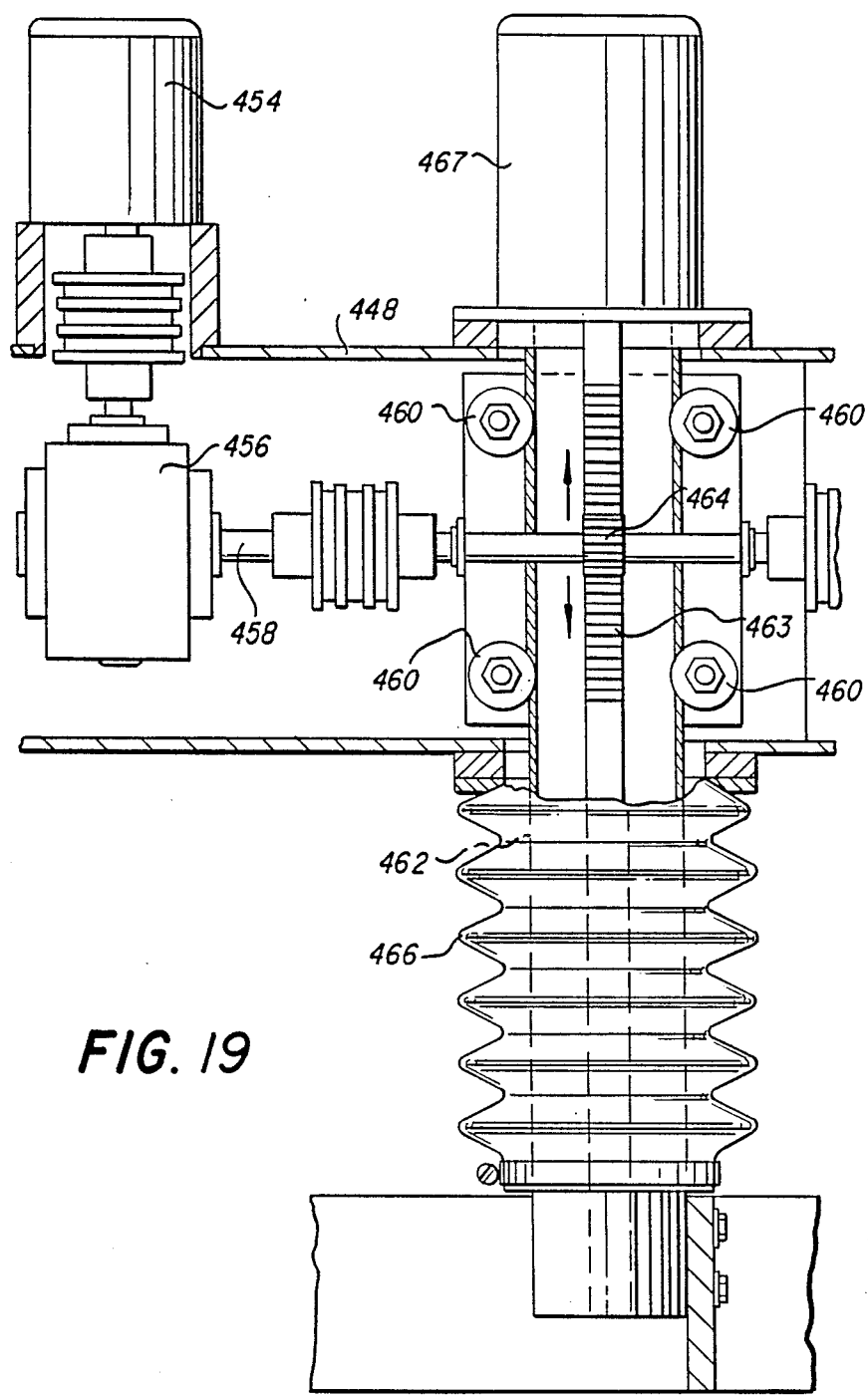
Figure 20:
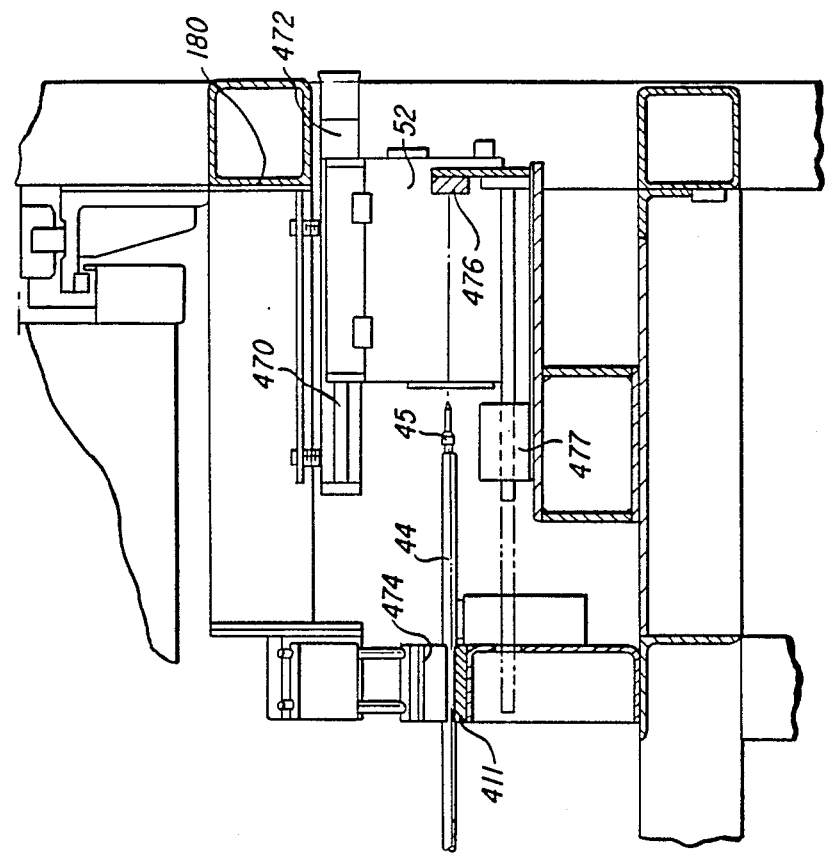
Figure 21:
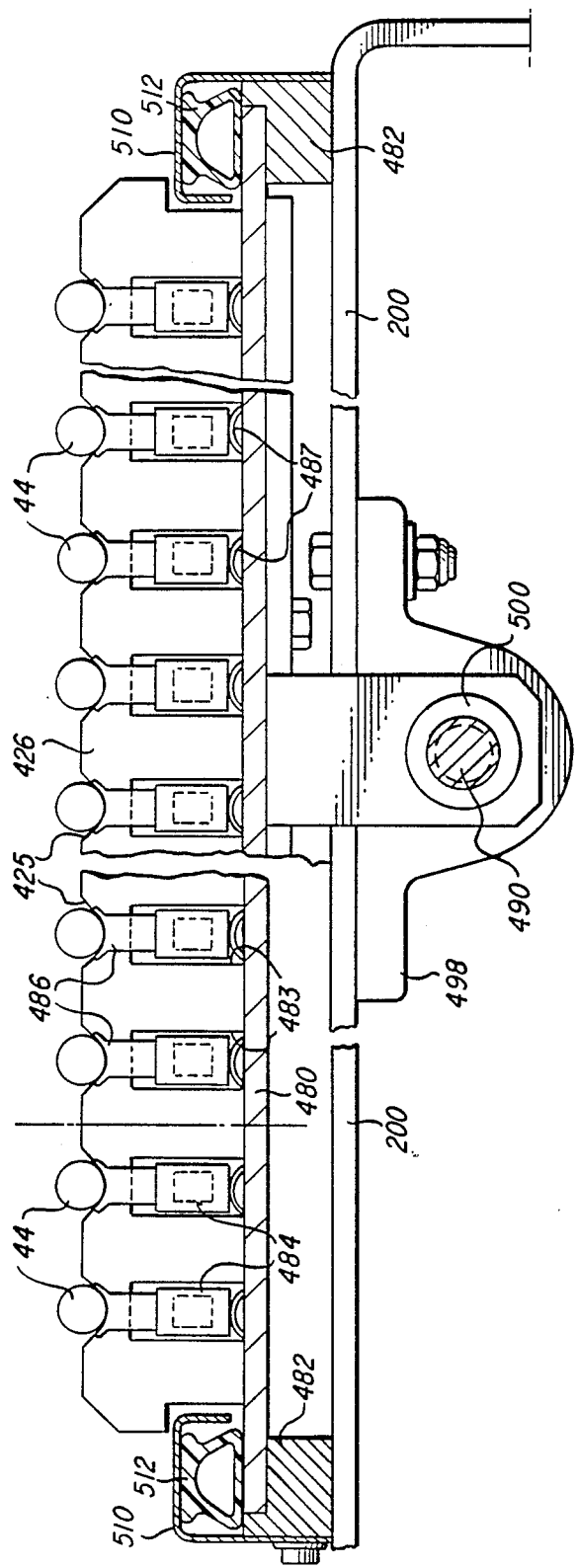
Figure 22:
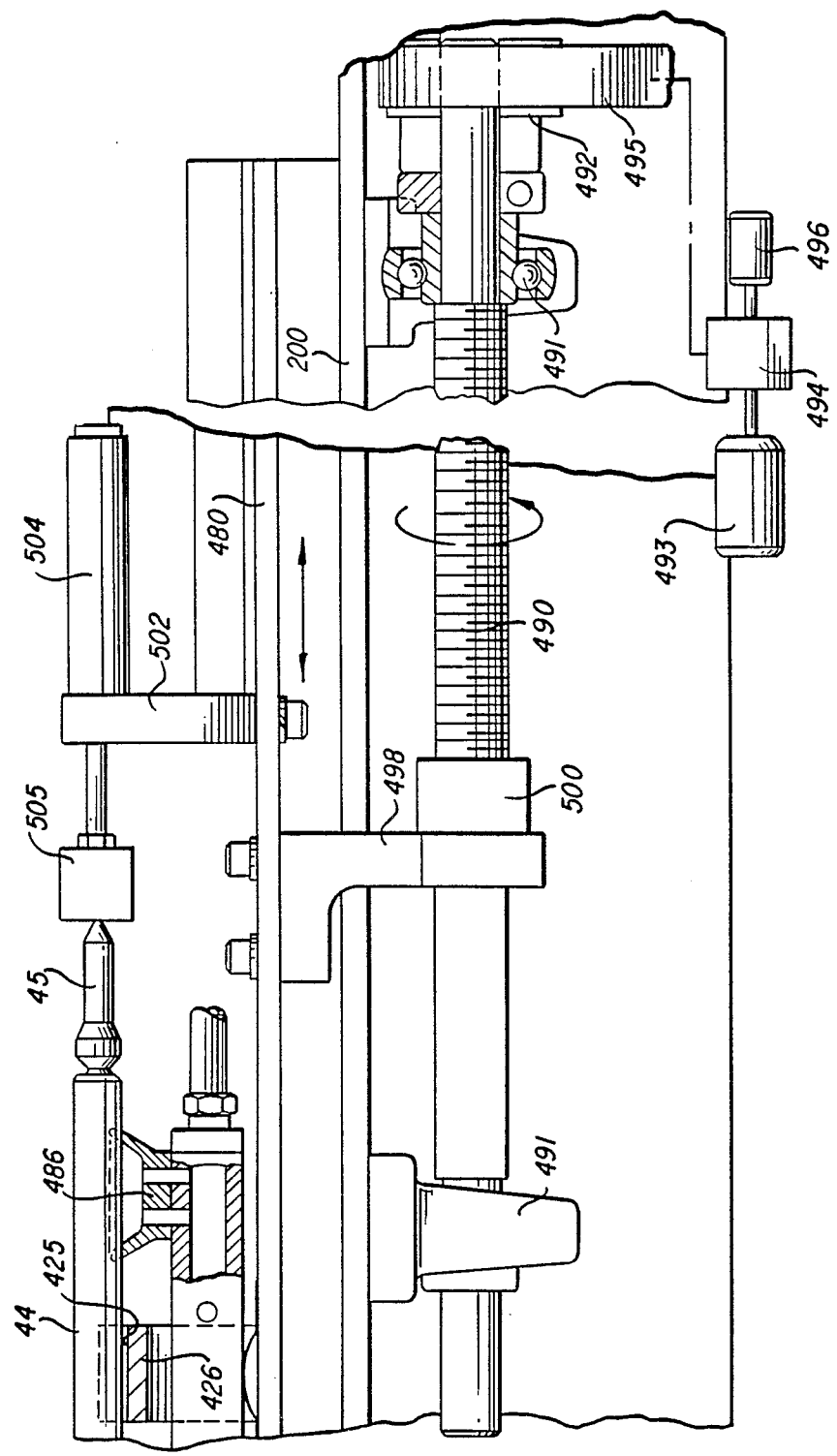

FIG. 6a and 6b, when joined in the manner indicated in FIG. 6, comprise a composite side view of a zone makeup machine utilized in the system of FIG. 1;

FIG. 7 is an end view representative of the mounting provisions for the various carriages utilized in the zone makeup machine of FIG. 6;

FIG. 8 is a plan view of the retractable stop utilized in the zone makeup machine of FIG. 6;

FIG. 9 is a side view, partially broken away, of the input carriage utilized in the zone makeup machine of FIG. 6;

FIG. 10 is an end view of the input carriage of FIG. 9;

FIG. 11 is a side view, partially broken away, of the zone makeup carriage utilized in the zone makeup machine of FIG. 6;

FIG. 12 is an end view, partially broken away, of the zone makeup carriage of FIG. 11;

FIG. 13 is a side view, partially broken away, of the loading carriage utilized in the zone makeup machine of FIG. 6;

FIG. 14 is an end view, partially broken away, of the loading carriage of FIG. 13;

FIG. 15 is an end view of a bushing assembly utilized in the system of FIG. 1;

FIG. 16 is a sectional view taken along line 16—16 of FIG. 15;

FIG. 17a and 17b, when joined in the manner indicated in FIG. 17, comprise a composite side view of the cladding tube handling apparatus utilized in the system of FIG. 1;

FIG. 18 is a fragmentary sectional view representative of the horizontal drive mechanism for each of the overhead cranes utilized in the tube handling apparatus of FIG. 17;

FIG. 19 is a fragmentary sectional view representative of the vertical drive mechanism for each of the overhead cranes utilized in the tube handling apparatus of FIG. 17;

FIG. 20 is a fragmentary sectional view of the optical character reader station utilized in the tube handling apparatus of FIG. 17;

FIG. 21 is a fragmentary end view of the cladding tube loading station utilized in the tube handling apparatus of FIG. 17; and FIG. 22 is a fragmentary side view of the tube loading station of FIG. 21.

Corresponding reference numerals refer to like parts throughout the several views of the drawings.

DETAILED DESCRIPTION OF THE INVENTION

The multizone automated nuclear fuel rod loading system of the invention, generally indicated at 20 in FIG. 1, includes a plurality of elevators 22, four in the illustrated embodiment, in which trays of fuel pellets of known enrichment concentrations are stored. A conveyor, generally indicated at 24, includes a pair of trolleys 26 on which selected pellet trays are loaded from the elevators for conveyance to a centrally located input station, indicated at 27, for a zone makeup machine, generally indicated at 28. Once a pellet tray is positioned by one of the trolleys at the input station, an input carriage 30 rakes multiple rows of pellets, ten rows in the illustrated embodiment, from the tray and advances the pellet rows over the grooved bed 32 of a measurement staging area, indicated at 34, and onto the grooved platform surface of a scale, generally indicated at 40, until halted by a longitudinally adjustable and laterally retractable stop 38. A zone makeup carriage 36 separates the advanced pellet rows at points of approximate zone length and removes the rows of excess pellets back to the staging area. The rows of pellets remaining on the scale platform are then accurately measured for length, and if necessary, carriage 36 adds individual pellets from the staging area or removes pellets back to the staging area to adjust the pellet rows to a common design length. The length-measured pellet rows are then weighted en masse by scale 40, to determine if the weight of the particular fuel rod pellet zones to be loaded meets design specifications. If the pellet zones are particularly long, they are made up, weighed and loaded in two or more stages.

Input carriage 30 has the capability of raking any rows of pellets leftover in the staging area back onto the tray from which they were unloaded, which has been waiting at the input station. The tray of excess pellets is then conveyed back to the particular elevator 22 from which it was retrieved. This situation occurs when the next zone to be made up calls for pellets of a different enrichment concentration. If there are no excess pellets in the measurement staging area to be returned to elevator storage, the tray at the input station is deposited in an empty tray stacker 42.

Still referring to FIG. 1, cladding tubes 44 to be loaded with fuel pellets are presented to multizone automated fuel rod loading system 20 in an input tray 46. An automated tube handling apparatus, generally indicated at 48, employs an overhead input crane 50 to transfer a plurality of tubes from this tray to an input queue 51 where the unique serial number borne by the end plug welded to one end of each tube is read in succesion at a reading station by an optical character reader 52. A predetermined number of tubes, in lots of ten in the illustrated embodiment, are then accumulated in a loading buffer 53 in properly spaced, parallel relation. A second or loading overhead crane 54 then transfers the tubes 44 from buffer 53 to a loading station which includes a vibratory loader, generally indicated at 56. The tubes are longitudinally or axially advanced en masse to loading positions with their open ends introduced to a guide bushing assembly 58. The tubes are retained in their loading positions, and vibratory loader 56 is activated to simultaneously advance the zone length-measured and weighed rows of pellets from scale 40 through the guide bushing assembly 58 where they enter and become loaded in the tubes. A loading carriage 60 trails the advancing pellet rows and detects a jamming condition encountered by any pellet row or rows. The operations of retrieving pellet trays from elevators 22, making up to length and weighing the pellet zones, and loading same into the tubes on the vibratory loader are repeated until the tubes are fully loaded to specification. Carriage 60 then acts to compact the pellet columns in the loaded tubes to ensure intimate interfacial pellet relation and to measure the distances from the ends of the pellet columns to the tube ends. These measurements ultimately represent the length of the plenum chamber in each completed fuel rod, which must meet strict design specifications.

The fully loaded tubes, which now may be considered as fuel rods, are then transferred from the vibratory feeder to an output queue 62, from which they are ultimately sorted into an accept tray 63 and a suspect tray 64 by an overhead sorting or output crane 66. Suspect rods are those that failed the plenum length check, experienced a jam during pellet loading or an unauthorized end plug serial number was read, meaning that a tube from a different tube lot was erroneously included in input tray 46. In this case, the tube is not loaded with pellets.

Control and coordination of the manifold operations of multizone automated fuel rod loading system 20 are provided by a system controller 68 linked with various process controllers in which are entered the design specifications, i.e., rod maps, to which a particular lot of fuel rods are to be manufactured.

Figure 2:
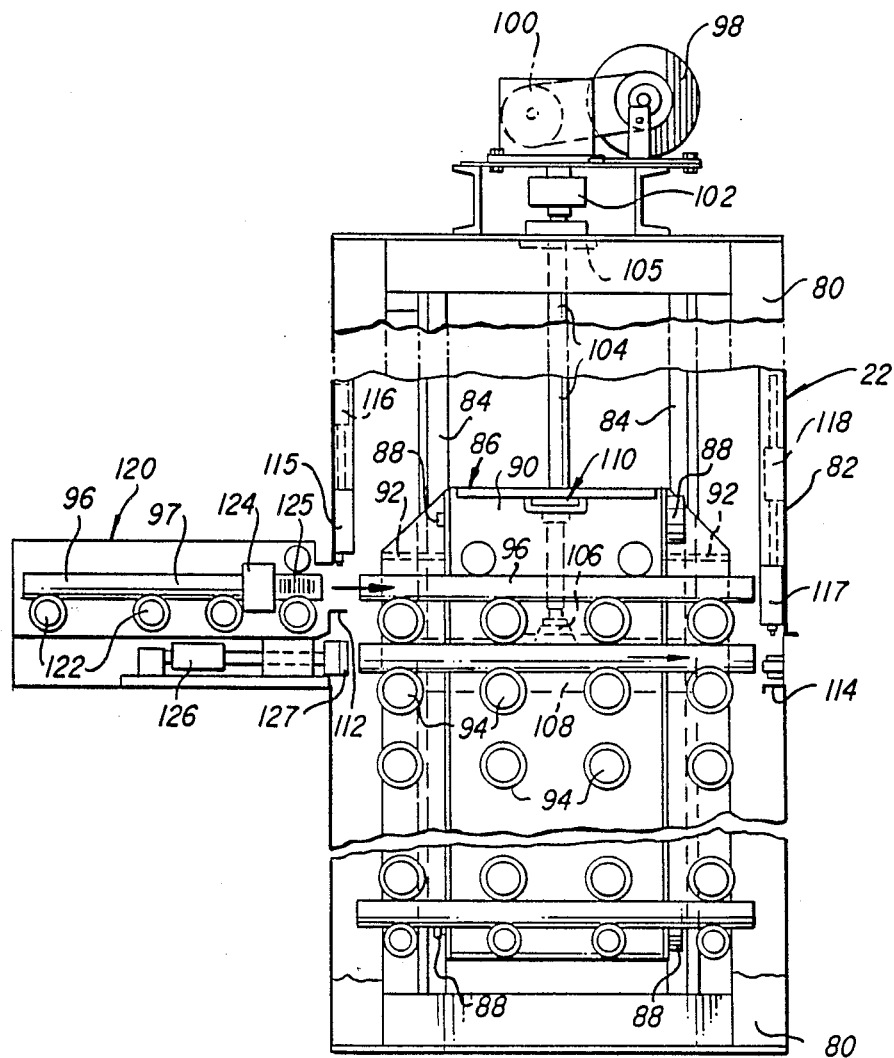
FIG. 2 is an elevational view, partially broken away, of one of the elevators in the system of FIG. 1 for storing fuel pellet trays.

Each of the four elevators 22 illustrated in FIG. 1 is similarly constructed in the manner seen in FIG. 2. Thus, each elevator includes a frame 80 to which panels 82 are affixed to provide an enclosure. The frame mounts a pair of vertical rails 84 on which an elevator car, generally indicated at 86, is slidingly mounted by precision guides 88. The car includes a pair of spaced, parallel side plates, one seen at 90, interconnected by cross members 92. These side plates mount uniformly vertically spaced sets of opposed, horizontally distributed, flanged rollers 94, each roller set providing an elevator storage position for a nuclear fuel pellet tray 96.

A motor 98, mounted to the elevator frame 80, acts through a transmission 100 and a clutch 102 to drive a vertical lead screw 104. The upper end of this lead screw is journalled in a bearing 105, while its lower end is journalled in a bearing 106 carried by a cross frame member 108. A travelling nut 110, carried by this lead screw, is affixed to one of the side plates 90, such that controlled bidirectional lead screw rotation by motor 98 can vertically locate a selected pellet tray storage position at either a loading port 112 or an unloading port 114. Tray loading access through port 112 is controlled by a door 115 vertically reciprocated by an air cylinder 116, while tray unloading egress through port 114 is controlled by a door 117 vertically reciprocated by an air cylinder 118.

Servicing port 112 is a loading dock, generally indicated at 120, which is equipped with a set of opposed, horizontally distributed, flanged rollers 122 for supporting a pellet tray 96 manually placed thereon. The loading dock is also equipped with a bar code reader 124 positioned to read a unique bar coded label 125 affixed to a siderail 97 of the tray as it is rolled into position in front of loading port 112. This bar code identifies the type of fuel pellets, most importantly enrichment concentration, on the tray and is read into system controller 68 (FIG. 1) to verify that this particular pellet type is scheduled for storage in this selected one of the elevators 22. If so, door 115 is opened, permitting a pellet tray 96 to be smoothly rolled into the storage position horizontally aligned therewith by motor 98 under the control of controller 68.

It will be noted from FIG. 2 that unloading port 114 is located one elevator car tray storage position below loading port 112. To unload a pellet tray from an elevator 22, as called for by the controller, an air cylinder 126 is mounted immediately beneath loading dock 120. This air cylinder reciprocates as ejector pad 127 acting to push a selected pellet tray through the opened unloading port 114 and partially onto one of the trolleys 26 of conveyor 24 (FIG. 1).

Figure 3:
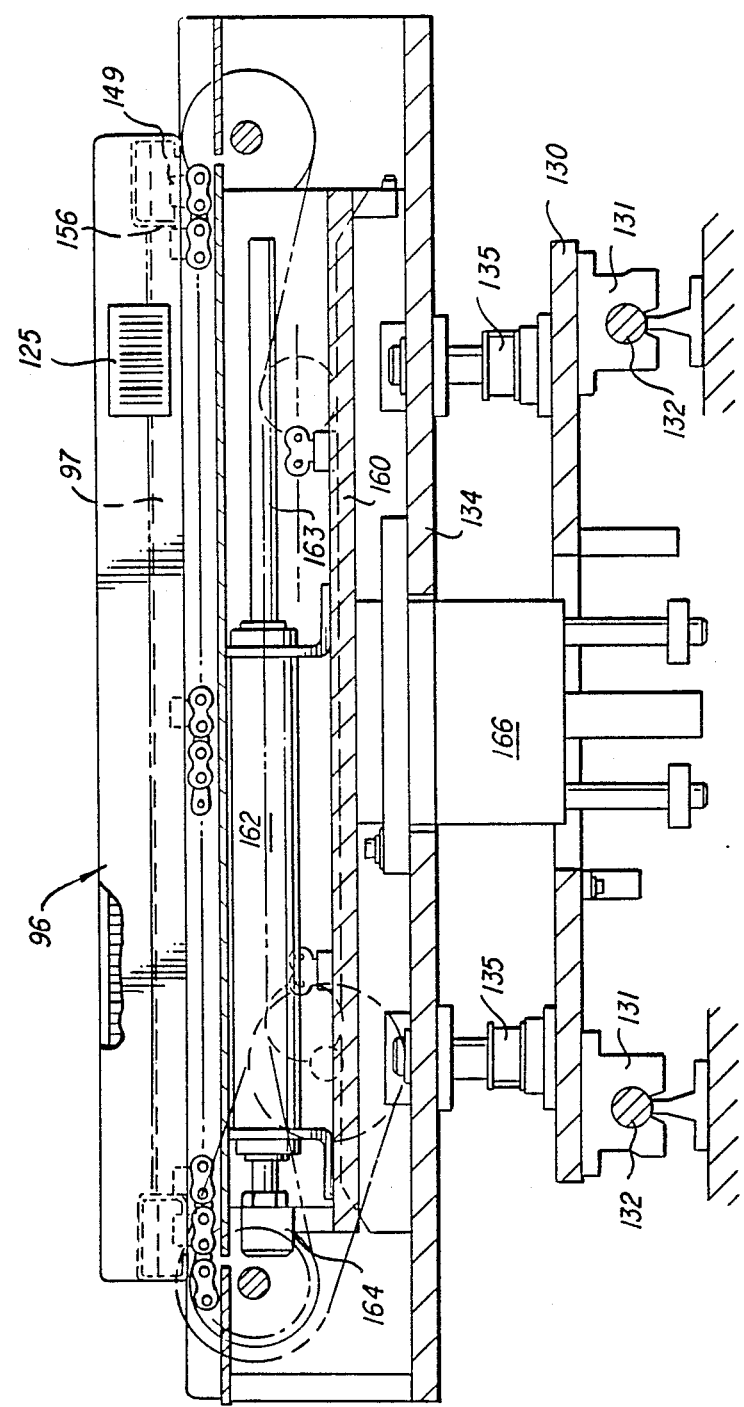
FIG. 3 is an end view, partially broken away, of one of the pellet tray conveyor trolleys utilized in the system of FIG. 1.
Figure 4:
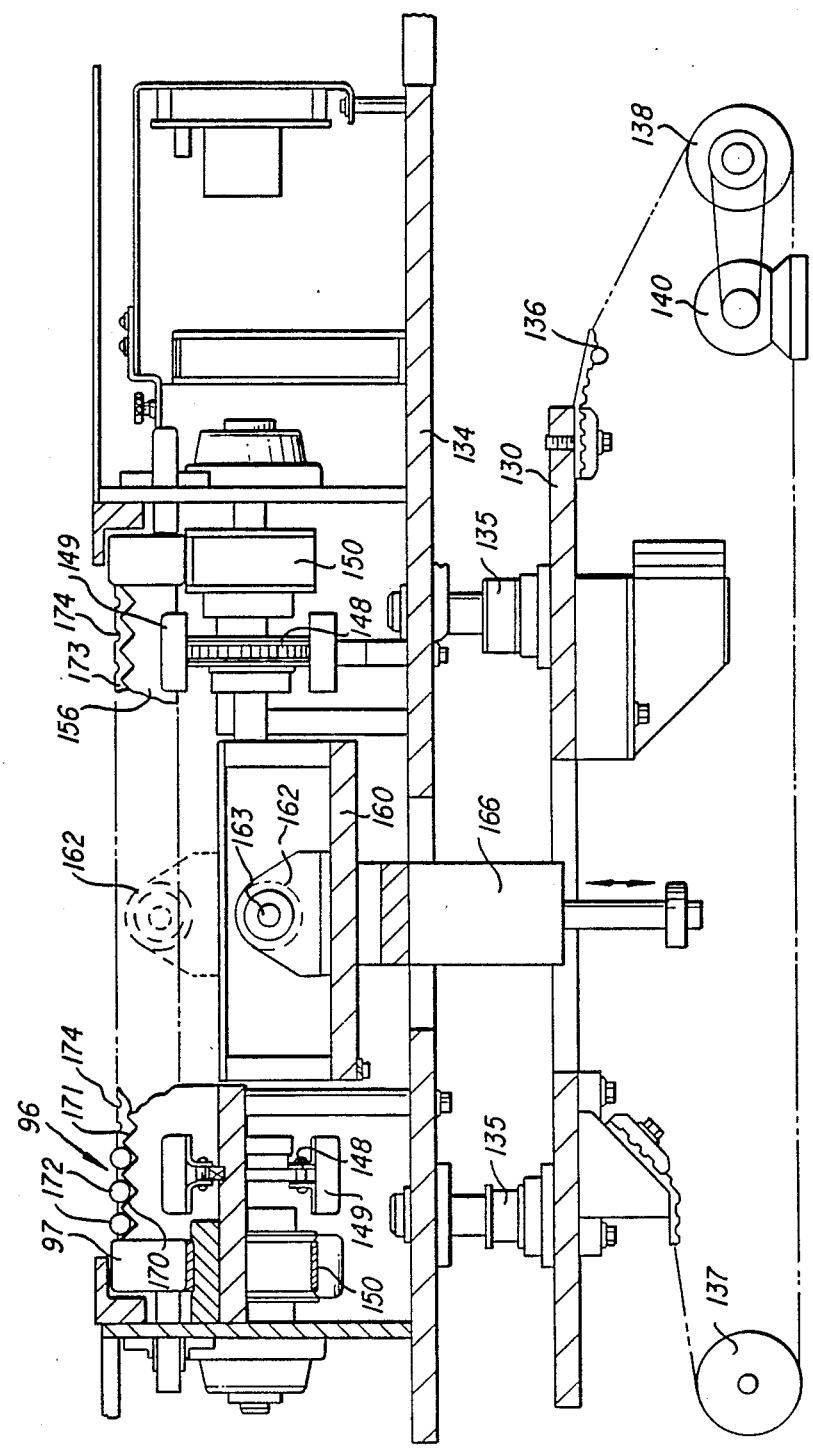
FIG. 4 is a side view, partially broken away and partially in diagramatic form, of the pellet tray conveyor trolley of FIG. 3.

Turning to FIG. 3, each trolley 26 includes a base 130 to which are affixed linear bearings 131 riding on a pair of common, parallel rails 132 extending the full length of conveyor 24 serving the illustrated four elevators 22. It will be appreciated that this conveyor could serve additional elevators stationed to its opposite side from the elevators depicted in FIG. 1. Alternatively or additionally the conveyor may be lengthened to serve additional elevators. This base, in turn, mounts a trolley frame 134 via standoffs 135. As seen in FIG. 4, opposite ends of a separate cog belt 136 are anchored to each trolley base 130. These cog belts are trained around separate idler pulleys 137 and drive pulleys 138 respectively positioned beyond the opposed limits of trolley conveyance, i.e., just beyond the common trolley unloading input station 27 for zone makeup machine 28 (FIG. 1) and just beyond the most remote elevator 22 it serves. These cog belts are driven by separate motors 140 to propel the respective trolleys between positions in alignment with the unloading port of either one of the two elevators they serve and the zone makeup macchine input station 27.

Figure 5:
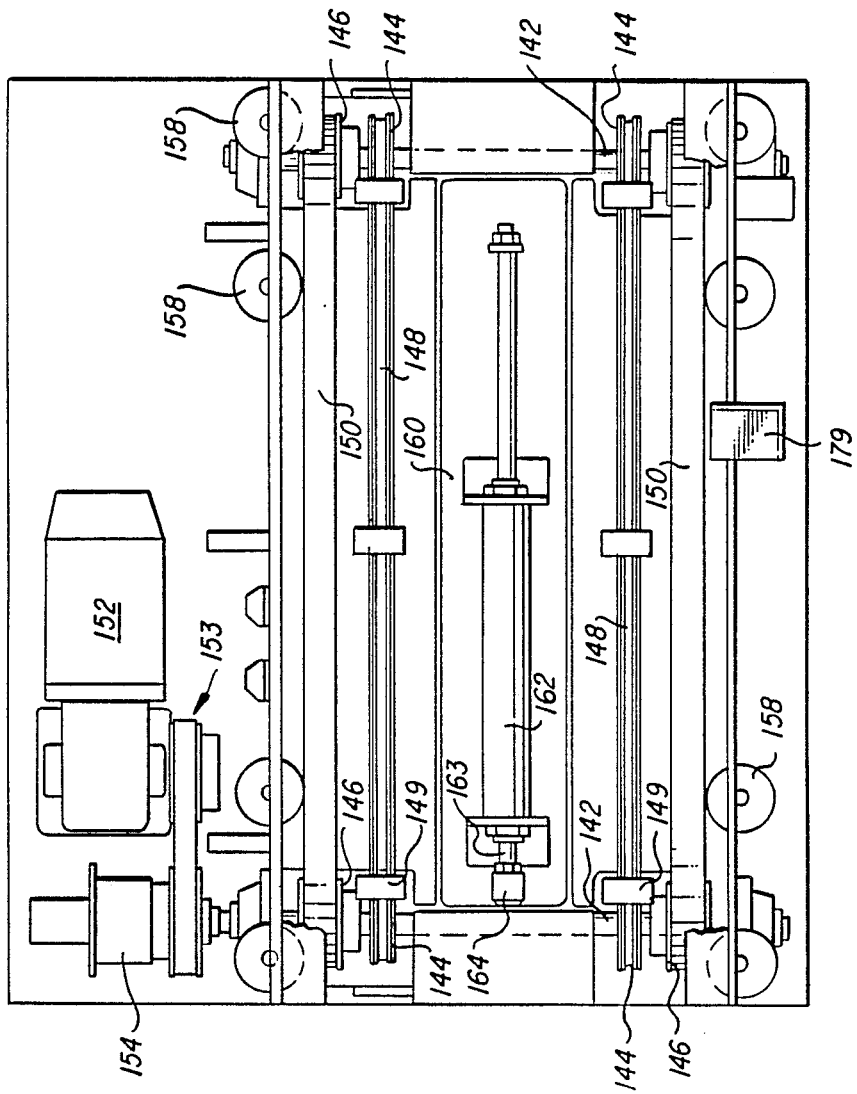
FIG. 5 is a plan view of the pellet tray conveyor trolley of FIGS. 3 and 4.

Turning to FIG. 5, each trolley frame journals a pair of opposed shafts 142, each carrying axially spaced pairs of chain sprockets 144 and belt pulleys 146. A conveyor chain 148 is trained around each transversely opposed pair of sprockets, while a conveyor belt 150 is trained around each transversely opposed pair of pulleys. One of the shafts 142 is driven by a gear motor 152 via a belt and pulley drive train, generally indicated at 153, and a clutch 154. When a pellet tray 96 is partially discharged through the unloading port 114 of an elevator 22 by ejector pad 127, as described in connection with FIG. 2, one of a series of dogs 149 carried by each conveyor chain 148 becomes engaged, as seen in FIG. 3, in the transverse opening in a channel-shaped frame member 156 extending along the leading edge of a pellet tray 96. The tray is then pulled fully onto a trolley 26 by the conveyor chains while the tray siderails 97 ride on the synchronously moving conveyor belts 150. A sensor (not shown) signals the gear motor to stop when a tray arrives at a designated position on trolley 26. As seen in FIG. 5, a series of opposed rollers 158 ride against the tray siderails to precisely guide the tray to its designated position on the trolley.

Referring jointly to FIGS. 3-5, a platform 160, centrally located beneath a tray supported on trolley 26, mounts a tray ejecting air cylinder 162. The plunger 163 of this air cylinder carries a pad 164 at one end. Oftentimes, a tray 96 containing pellets leftover from a zone makeup operation is returned from the zone makeup machine to the one of the elevators from which it was retrieved. Motor 152 then drives the conveyor chains 148 and belts 150 in the reverse direction to propel the tray into an unloading port 114 (FIG. 2). However, the conveyor chain dogs 149 become disengaged from the tray before it is fully restored to its storage position with the elevator. Thus, platform 160 is elevated by an air cylinder 166 to bring air cylinder ejector pad 164 to the level of the trailing tray cross member 156, as illustrated in phantom in FIG. 4. Air cylinder 162 is activated to extend its plunger, bringing its pad 164 to bear against the outer surface of the trailing cross member and driving the tray the remaining distance into its elevator storage position. This tray offloading operation is also utilized to deposit an empty tray in stacker 42 (FIG. 1). While not detailed herein, this empty tray stacker includes a vertically oriented conveyor equipped with a series of tray supporting members which are indexed into position at an entry port for accepting successive tray deposited therethrough from trolleys 26. If the system is expanded to include additional elevators 22 located on the opposite side of trolley conveyor 24 from the four shown in FIG. 1, a second tray ejecting air cylinder 162 would be added to platform 160 to handle tray offloading thereinto.

As seen in FIG. 4, the rectangular pellet trays 96 are constructed with a corrugated accordian-shaped floor 170 supported on the cross members 156 extending between siderails 97. The floor thus provides a plurality of V-shaped troughs 171 accommodating rows of fuel pellets 172 resting on their cylindrical surfaces. These troughs are open at the one end facing zone makeup machine 28 when the tray is conveyed on a trolley to input station 27 aligned with the staging area 34 thereof (FIG. 1). The other ends of the troughs are closed off by a fence 173 which is notched along its upper edge, as indicated at 174 in FIG. 4, to permit, as detailed hereinafter, the individual raking fingers of input carriage 30 to engage the last pellet in each row pursuant to pushing the pellet rows from the tray onto the grooved bed 32 of the staging area.

Each trolley 26 further includes, a bar code reader 179 (FIG. 5) for reading the bar coded label 125 (FIG. 3) affixed to the tray side rail 97 as a tray 96 is positioned on a trolley by the conveyor chains 148 and belts 150. This reading is entered into controller 68 to verify that the correct fuel type called for was in fact retrieved from an elevator 22. This reader also reads the bar code label on a tray of excess pellets being returned to an elevator for storage and, via controller 68, initiates the lifting of door 117 to access port 114 of the one elevator from which it was retrieved. This safeguard precludes spurious intermixing of fuel pellet types in the elevators.

Zone makeup machine 28, as seen in FIGS. 6a and 6b, includes a framework 180 for longitudinally, slidably mounting input carriage 30, zone makeup carriage 36 and loading carriage 60. The input carriage is propelled in bidirectional longitudinal motion by a lead screw 182 driven by a motor 183. Input carriage longitudinal position is tracked by a position encoder 184 linked with controller 68. Motor 183 is controllably energized to drive the input carriage to its illustrated leftmost position where its raking fingers 186 are poised to engage the last pellet of the pellet rows on a tray 96 made accessible by fence notches 174 (FIG. 4). The input carriage is then propelled rightward to rake multiple rows of pellets from the tray V-shaped troughs into the aligned, longitudinally extending grooves in the surface of staging area bed 32. To increase tray capacity, the trough spacing is one-half the groove spacing on bed 32. The lateral spacing of raking fingers 186 necessarily corresponds to that of the bed groove spacing. Thus, every other row of pellets is raked from the tray at a time, the tray is incremented by its trolley to align the remaining pellet rows with the bed grooves, and the input rake goes back to rake these pellet rows onto the staging area. If the trays contain twenty pellet rows, and the staging area accommodates ten rows, each tray is emptied in two raking cycles of the input carriage.

Input carriage 30 is capable of only offloading entire rows of pellets from a tray onto the staging area. Thus, when short zones are to be loaded, there will be partial rows of pellets leftover in the staging area. As previously noted, the input carriage is then controlled to rake these rows of leftover or excess pellets back onto the tray waiting at input station 27. The trolley then conveys this partial tray of pellets back to the elevator 22 from which it was retrieved for storage until it is again called for. If there are no leftover pellets in the staging area, the tray is ejected from the trolley into the empty tray stacker 42 positioned in alignment with the zone makeup machine loading position. To ensure smooth raking transition of pellet rows between the staging area and a tray, bed 32 is preferably pivotally mounted to incrementally raise or lower its transverse left edge relative to the tray floor.

Still referring to FIGS. 6a and 6b, zone makeup carriage 36 is longitudinally translated by a lead screw 190 driven by a motor 191, with carriage longitudinal position being tracked by an encoder 192. The leftmost limit of zone makeup carriage movement overlaps the rightmost limit of input carriage movement, and thus the former carriage can assume control of all pellets advanced by the latter. Carriage 36 is equipped with a transverse array of gripper fingers 194 which are capable of grasping individual pellets at selected transversely aligned intermediate positions in the pellet rows advanced to stop 38 by the input carriage. Carriage 36 is then propelled leftward by its motor to push the rows of excess pellets back toward the staging area 34, leaving partial pellet rows of approximate zone length to be made up on the platform 196 of scale 40. The zone makeup carriage further includes a transverse array of measurement fingers 195 which are advanced into engagement with the pellet rows positioned against stop 38 to obtain a precise zone length measurement for each row. Using its gripper fingers 194, the makeup carriage selectively adds or subtracts individual pellets to or from the rows until the prescribed zone lengths within tolerable limits, as determined by measurement fingers 195, are achieved for each row, all under the control of controller 68. If the supply of pellets in staging area 34 is exhausted before the prescribed zone length can be made up, another tray of the same fuel type is retrieved from elevator storage and offloaded. On the other hand, if the prescribed zone length exceeds the capacity of the scale platform, the pellet zones are made up and loaded in stages under the control of controller 68.

Once the pellet rows are made up to the requisite zone length or portion thereof on the grooved surface of scale platform 196, which rests on a precision electronic scale 198 in turn supported by framework 199, the combined weight of the ten pellet rows is registered. This weight reading is entered into the controller, averaged, and factored to the measured length of each pellet row to determine if the weight of each pellet zone is to design specification. Stop 38 is then retracted, carriage gripper fingers 194 advance the pellet rows onto the correspondingly grooved surface of a bed 200 of vibratory loader 56. A plurality of mechanical vibrators 202 are distributed along the length of bed 200 and physically connected to the underside thereof. These vibrators are activated to promote the simultaneous loading of pellet rows into the cladding tubes 44 which have been arranged in their loading positions at guide bushing assembly 58 (FIG. 1, 15 and 16) by automated tube handling apparatus 48. Pellet row loading is backed up by loading carriage 60 which is propelled by a lead screw 204 driven by a motor 205 and tracked by position encoder 206. This carriage, whose leftmost travel limit overlaps the rightmost travel limit of zone makeup carriage 36, is equipped with fingers 208 depending into engaging relation with the pellet rows. Rightward movement of the loading carriage advances these fingers in follow-up fashion with the advancement of all of the pellets of the pellet rows through guide bushing assembly 58 and into the waiting tubes 44 under the motivation of vibratory loader 56. As described in connection with FIGS. 13 and 14, fingers 208 sense any jamming of the pellet rows as they are being loaded. Loading carriage 60 is additionally equipped with probes 209 for performing plenum length checks on each of the cladding tubes once fully loaded with pellets, as will be described in connection with FIGS. 13–16.

As also seen in FIGS. 6a and 6b, an exhaust system with intake registers 210 distributed along the longitudinal length of zone makeup machine 28 removes any dust and pellet particles that may be created during the automated handling of the fuel pellets.

As seen in FIG. 7, the three carriages 30, 36, and 60 are slidingly mounted on elongated, upper and lower rails 220 by precision linear bearings 221 affixed to a carriage mounting plate 222. Taking zone makeup carriage 36 for example, a travelling nut 224 is affixed to this mounting plate and is threaded on lead screw 190. Motor 191 drives this lead screw to produce bidirectional carriage propulsion via a pulley-timing belt arrangement generally indicated at 226. A supporting plate 228 for the carriage control head, generally indicated at 230, is hingeably mounted to carriage plate 220 along its upper edge, as indicated at 231. This permits the control head to be swung upwardly for inspection and maintenance. Pivotally interconnected support links 232 sustain the raised position of the control head. Levelling bumpers 234 are provided to adjust the control head to the desired operating orientation.

As seen in FIG. 8, stop 38 is slidably mounted on a rod 236 supported by a plate 238 which, in turn, rides on a pair of longitudinal rails 240. Plate 238 carries a travelling nut 239 threaded on a lead screw 241 which is bidirectionally driven by a motor 242 via a pulley-timing belt drive, generally indicated at 243. Stop longitudinal position is tracked by an encoder 244 which is linked to controller 68. The motor is driven on command to variously longitudinally position stop 38 in accordance with the length of the particular pellet zones to be made up by operation of zone makeup carriage 36. Once the pellet rows have been made up to the specified zone length on scale platform 196, stop 38 is transversely retracted on rod 236 by an air cylinder 246 whose body is affixed to the stop, while its plunger 248 is affixed at opposite ends to plate 238. The way is then cleared for weighed pellet rows of specified zone length to be advanced by carriage 36 to vibratory loader 56.

Input carriage 30, as seen in FIGS. 9 and 10, includes a control head, generally indicated at 250, having a housing 252 which is mounted by elongated screws 253 to a head support plate, such as indicated at 228 in FIG. 7. A transverse array of side-by-side raking finger blocks 254 are supported by individual sets of grooved rollers 256 on separate, longitudinally elongated rails 258 mounted at their ends by housing 252. Air cylinders 260, mounted by the housing, are respectively connected by their plungers 261 to the individual blocks 254 and operate to longitudinally position these blocks on their rails 258 either to their rightmost solid line position or their leftmost phantom line position seen in FIG. 9. When the blocks are in either of these extreme positions, their positioning air cylinders are conditioned to serve as air springs acting to individually bias the blocks thereto.

Each block 254, in turn, is equipped with an elongated, vertically oriented raking finger 186 carrying a pellet-engaging tip 263 at its free end. Each raking finger is mounted to its block 254 by a set of grooved rollers 264 for vertical reciprocation by a separate air cylinder 264 supported atop the block with its plunger 267 connected to the upper end of the finger. A set of optical sensors 270 equipped with fiber optics 271 individually monitor each raking finger block in its rightmost position, while a separate set of optical sensors 272 individually monitor each raking finger block in its leftmost position via fiber optics 273.

When input carriage 30 is called upon to rake rows of pellets 275 from a tray 96 brought to input station 27 by a trolley 26, raking fingers 186 are uniformly elevated by their air cylinders 266, and the carriage is driven to its leftmost position seen in FIG. 6a by its lead screw 182. Air cylinders 260 commonly position finger blocks 254 to their rightmost position and resiliently hold them there by air pressure. The raking fingers are then lowered to their pellet-raking positions by air cylinders 266. The input carriage is then driven rightward by its lead screw to rake pellet rows from the tray onto the grooved bed 32 of staging area 34. Should any one of the pellet rows experience a jam, the block 254 of the raking finger involved is forced leftward away from its rightmost position. If the jam does not clear itself before the block moves a predetermined distance leftward, for example one-half inch, the associated sensor 270 issues a signal halting carriage raking movement. The input carriage is backed up sufficiently to allow the effected block to be returned to its rightmost position by its air cylinder 260, thus to relax the raking force on the jammed pellet row and hopefully relieve the jam. Rightward raking input carriage movement is resumed. If the jam condition persists, the associated sensor 270 again signals the carriage to stop, and an alarm is sounded calling for operator attention. The input carriage can either wait for the operator to manually clear the jam or can be controlled such that the affected raking finger is automatically elevated by its air cylinder 266 and raking resumed with respect to the unjammed pellet rows.

Basically the same operating procedure prevails when the input carriage 30 is called upon to handle rows of pellets which are leftover from a particular zone makeup operation. In this case, the rows of excess pellets 275 must be raked from the buffer area 34 back onto a tray 96 at the input position for return by its trolley 26 to the particular elevator 22 from which it was retrieved. Thus finger blocks 254 are positioned to and resiliently held at their leftmost positions by their air cylinders 260. Sensors 272 sense a jam condition during leftward raking of the pellet rows and serve in controlling carriage motion in the same manner as described above for rightward pellet row raking.

Zone makeup carriage 36, as seen in FIGS. 11 and 12, includes, as indicated in connection with FIG. 7, a control head 230 having a housing 280 for supporting longitudinally elongated, transversely spaced rails 282. A separate measuring finger block 284 is mounted by a set of grooved rollers 286 on each rail. These blocks are normally positioned in their illustrated rightmost positions by the plungers 287 of separate air cylinders 288 and resiliently held there by air pressure. Leftward block movements away from their rightmost reference positions are separately gauged by suitable linear dimension measuring devices 290, such as linear variable differential transformers, having reciprocating rods 291 respectively connected to the blocks.

A separate measuring finger 195 is mounted by a set of grooved rollers 294 to each block for individual vertical reciprocation by the plunger 295 of an air cylinder 296. In addition, the sets of gripper fingers 194 are mounted by the housing rightwardly of and in individual longitudinal alignment with each measurement finger. A separate air cylinder 300 actuates each gripper finger set into and out of gripping engagement with a fuel pellet 275 in each pellet row lying on the grooved surface of scale platform 196. Finally, a transverse array of optical sensors 302, via their fiber optics 303, detect and signal leftward movements of the individual blocks away from their rightmost reference positions.

In a zone makeup operation, stop blade 38 is automatically longitudinally positioned to locate the ten pellet rows in the illustrated embodiment, once made up to a specified, common zone length, in appropriate aligned positions on scale platform 196. While the zone makeup carriage measurement fingers 195 are elevated and the sets of gripper fingers 194 are separated, input carriage 30 rakes the ten pellet rows onto the scale platform until halted by the stop blade. The input carriage is then backed off and parked at an out-of-the-way position in staging area 34. The stop blade is then advanced rightward (FIG. 6b) a predetermined distance to create uniform gaps between it and the leading pellet in each row. Makeup carriage 32 is then longitudinally positioned such that its zone length measuring fingers 195 can be lowered into these gaps. The makeup carriage is advanced rightward to bring the fingers into engagement with the stop blade. When sensors 302 detect the finger blocks 284 being shifted from their rightmost position, the carriage position, as indicated by its lead screw encoder 192, and the individual voltage outputs of the differential transformer 290 are noted by the controller. These touch-offs of the fingers 292 against stop blade 38 enable calibration of the makeup carriage encoder and differential transformer signal outputs to the stop blade longitudinal position established by the controller consistent with the length of the pellet zones to be made up.

The length measuring fingers 195 are elevated, and the makeup carriage is translated leftward, i.e., backed up, an appropriate distance determined by the summation of the zone length to be made up, the gap dimension between the stop blade and the leading pellet in each row, and the known longitudinal separation between the measurement fingers and the gripper fingers. Assuming the pellets are all of nominal thickness, the makeup carriage should then be positioned with its gripper fingers abreast of the pellets just beyond the last pellet of the zone to be made up in each row. The sets of gripper fingers close to engage these pellets, and carriage 32 is incremented leftward a predetermined distance to create uniform gaps in the pellet rows. The gripper fingers are opened, and the carriage is incremented rightward to position the gripper fingers in these gaps and then closed. The carriage 32 is then translated leftward a predetermined distance, and the rows of excess pellets are raked back by the closed gripper fingers to create a wider gap sufficient to accommodate the lowering of the measuring fingers thereinto upon repositioning of the makeup carriage and separation of the gripper fingers. The makeup carriage is translated rightward, and the fingers 195 rake the rows of pellets up against stop blade 38 to determine from the readings of encoder 192 and differential transformers 290 if the pellet rows have been made up to the specified zone length. Since pellet length does vary, the differential transformer signal outputs will typically not be uniform. From these signal outputs, the controller determines whether a pellet or pellets must be added to or removed from a particular row or rows in order to achieve a zone length for each row that is within design tolerance limits. If a pellet must be removed from a particular row, the makeup carriage is positioned such that the gripper fingers for that row can grip the last pellet therein, and the carriage is translated leftward to take the removed pellet back to where the rows of excess pellets stand waiting. If a pellet is to be added to a particular row, the make up carriage goes back to a position where the appropriate gripper fingers can grip the leading pellet in the same row of excess pellets and advance it rightward to create a gap sufficient to accept a measuring finger. The pellet is then raked into juxtaposition with the pellet row backed up against the stop blade and another length measurement is taken to verify that the pellet row is now of acceptable zone length.

Once all ten rows have been made up to the specified zone length, the makeup carriage, using its closed gripper fingers, rakes the rows of excess pellets off scale platform 196. The zone-made up pellet rows are then weighed by scales 198. The makeup carriage is then translated rightward with its measuring fingers lowered to rake the zone length measured and weighed pellet rows off the scale platform and onto the grooved surface of vibratory loader bed 200.

Loading carriage 60 includes, as seen in FIGS. 13 and 14, a control head 318 having a frame 320 for mounting longitudinally elongated rails 322 on which individual finger blocks 324 are separately supported by sets of rollers 326. These blocks are biased to uniform rightmost normal positions on their rails 322 by separate air cylinders 328 adapted to act as air springs. Leftward block movements out of their normal positions are detected by separate optical detectors 330 and are measured by separate linear variable differential transformers 332. Each block mounts a separate jam sensing finger 208 on a set of grooved rollers 336 for vertical reciprocation by an air cylinder 338. A pellet engaging tip 340 is affixed to the lower end of each finger 208. Each block additionally carries a separate plenum measuring finger 342 on a set of rollers 344 for vertical reciprocation by an air cylinder 346. An elongated, pellet engaging probe 209 is affixed to the lower end of each finger 342.

To load the ten rows of zone length measured and weighed pellets advanced to the vibratory loader 56 by makeup carriage 36, the plenum probe fingers 342 are raised, and the jam fingers 208 are lowered into positions behind the last pellet in each row. The vibratory loader is activated, and the pellets begin propagating toward guide bushing assembly 58 into which the open ends of ten cladding tubes 44 have been inserted and seated by tube handling apparatus 48 (FIG. 1). Loading carriage 60 is translated rightward to move its jam sensing fingers 208 along in follow-up relation with the rows of pellet zones being advanced toward the bushing assembly by the vibratory loader. Should a pellet row or rows experience a jamming condition, the finger or fingers 208 will butt against the jammed row, hopefully relieving the situation. If this fails, the affected finger block or blocks 324 are forced leftward away from their normal rightmost positions. The associated sensor or sensors 330 detect the jam condition and signal loading carriage 60 to stop. The carriage is backed off and then advanced again to determine if the continued agitation of the pellets by the vibratory loader has cleared the jam. If it has, loading of the now unjammed pellet rows resumes in catch-up fashion with the other pellet row. If the jam is not cleared, the affected sensor signals the carriage to stop and the operator is alerted to manually clear the jam. If desired, the loading carriage may be programmed to raise the finger 208 for the jammed pellet row and proceed on with the loading of the other pellet rows.

Once the ten tubes 44 have been fully loaded with multiple zones of pellets, the plenum probe fingers 342 are lowered by their air cylinders 346. Loading carriage 60 is then repositioned and translated rightward to advance plenum measuring probes 209 through guide bushing assembly 58 and into the tubes 44. The probe tips engage the pellet columns within the tubes to urge the pellets into interfacial contact. As probe finger blocks 324 are forced from their rightmost normal position against the bias of their air cylinders 328, events individually signalled by the associated ones of sensors 330, readings of loading carriage encoder 206 (FIG. 6b) and associated differential transformer 332 are processed by controller 68 to derive the plenum length measurements for each tube. The plenum length measurements are then checked to determine if they fall with predetermined design limits.

Guide bushing assembly 58, as seen in FIGS. 15 and 16, includes a transverse array of ten tubular bushings 360 carried by a mounting block 362 affixed to vibratory loader bed 200 at the interface between zone makeup machine 28 and tube handling apparatus 48. As seen in FIG. 16, each bushing 360 has a bore 364 of a diameter slightly larger than the pellet diameter with a chamferred pellet lead-in portion 366 for accepting pellets 275 being loaded by vibratory loader 56 and loading carriage 60. A conical tube lead-in section 368 terminating in a circumferential ledge 370 is provided at the other end of each bushing bore. As will be described in connection with FIGS. 21 and 22, tube handling apparatus 48 operates to locate the ten tubes 44 in their pellet loading positions with the tube open ends seated against the ledges 370 to provide a smooth transition for the pellets from the bushing bores to the tube bores.

Affixed to mounting block 362 are a pair of opposed guide flanges 372 which serve to slidingly mount an elongated shutter bar 374 having a set of spaced holes 376 of a diameter somewhat larger than the tube outer diameter interleaved with a set of smaller holes 378 of a diameter just sufficient to accommodate the penetration of plenum probes 209 (FIG. 13). This shutter is linked to the plunger 380 of an air cylinder 382 which is selectively controlled to transversely position the shutter bar with holes 376 respectively registered with the bushing bores to accept tubes 44 for pellet loading. An emitter 384, situated in front of shutter 374, directs a beam of light intersecting the axes of the bushing bores 364 toward a transversely aligned receiver, indirected in phantom at 385. As will be described in connection with FIGS. 21 and 22, this light beam is broken as the cladding tubes arrive at the bushing assembly, incident to being axially shifted from their pre-loading positions, to signal the final positionings thereof to their loading positions seated against circumferential ledges 370.

In operation, the shutter bar holes 376 are registered with the bushing bores to accommodate seating the tube ends against ledges 370, and thus the tubes are in their loading positions to accept pellets from zone makeup machine 28. Once loading has been completed, loading carriage 60 is then translated to advance its probes 209 through the bushing bores and into the tube bores. As described above in connection with FIGS. 13 and 14, when the probes butt against the pellet columns in each tube, their mounting blocks are forced from their normal positions and, when signalled by sensors 330, loading carriage encoder and differential transformer readings are taken in each instance. Plenum length measurements are thus separately determined for each tube; each measurement being the axial separation between the outer face of the last pellet in the column and the tube open end which is referenced against a circumferential ledge 370.

To conveniently calibrate these plenum measurement checks, air cylinder 382 is controlled to transversely position shutter bar such that the solid bar portions intermediate holes 376 are registered with the bushing bores. The loading carriage is then translated to advance its probes through the bushing bores into contact with this inner, reference surface of the shutter bar. When the sensors 330 signal that their finger blocks have moved off their rightmost normal positions, the loading carriage position encoder and differential transformer readings are taken as zero reference readings. When the plenum length measurement checks are made, the known distance between the shutter bar reference surface and each circumferential ledge 370 is simply added to each length determination to obtain a precise gauging of the plenum length existing in each tube. To promote smooth loading movement of pellets 275 through bushings 360 and to minimize the introduction of pellet dust into tubes 44, a gas may be introduced to a section of each bushing bore 364 via an inlet manifold 390 and exhausted via an outlet manifold 392, both formed in mounting block 362.

The automated tube handling apparatus 48 of FIG. 1 is illustrated in greater detail in FIGS. 17a and 17b. Tray 46, containing a plurality of cladding tubes 44 stacked in tiers of ten across, is rolled into unloading position on a roller conveyor, generally indicated at 400 in FIG. 17a. Overhead tube input crane 50 is transversely positioned on elevated rails 402 with its pickup beam 404 vertically aligned with tray 46. This beam is equipped with longitudinally spaced sets of transversely aligned suction cups 406 which are lowered into engagement with the upper tier of tubes in tray 46. A vacuum is pulled on these cups, and beam 404 is raised to lift the tier of ten cladding tubes 44 clear of the tray. The input crane is then translated rightward to a position vertically aligned with input queue 51. Pickup beam 404 is lowered to deposit the tubes on respective, transversely aligned tube carrier elements 408a of longitudinally distributed input queue conveyors 408. The carrier elements of each conveyor are carried by an endless roller chain 409a trained around a spaced set of sprockets 409b. One sprocket of each conveyor is driven off a common chain drive generally indicated at 410. The vacuum on suction cups 406 is released, and the beam is raised to clear the input queue area leaving the tubes resting on the input queue conveyors.

The input queue conveyors 408 are then activated in the clockwise direction seen in FIG. 17a until the right most tube thereon is transferred to a longitudinally distributed series of ramps 411. Each singularly transferred tube rolls rightward on these ramps to a serial number reading station defined by vertical stops 413. As will be seen in FIG. 20, optical character reader 52, illustrated in phantom in FIG. 17a, is longitudinally reciprocated into optical reading relation with the end plug of the tube residing at the reading station. The end plug serial number read by the reader is entered into the system controller for recordkeeping purposes.

Once the endplug serial number of a tube is read, a longitudinally aligned series of lifters 415 are jointly vertically reciprocated to lift the tube over stops 413 and transfer it to a longitudinally distributed series of ramps 414. The transferred tube rolls rightward on these ramp surfaces to a position where it is picked up by waiting, longitudinally aligned carrier elements 416 of plural loading buffer conveyors, generally indicated at 418. These tube carrier elements are carried by an endless chain 419 trained about longitudinally spaced sets of sprockets 420. As each tube is picked up by one longitudinally set of carrier elements 416, loading buffer conveyors 418 are synchronously indexed to bring the next set of carrier elements into positions adjacent the ends of ramps 414 to pick up the next tube.

The carrier elements of each loading buffer conveyor are serially positioned relative to each other such as to establish the requisite inter-tube parallel spacing for fuel pellet loading. Once the full lot of ten tubes have had their serial numbers read and have been accumulated in the requisite parallel, spaced relation by the loading buffer conveyors, loading crane 54 is called into operation. This crane is automatically positioned on rails 402 with its pickup beam 422 in vertical alignment with loading buffer 53. This beam is lowered to bring longitudinally distributed sets of suction cups 424 of the requisite transverse spacing into engagement with the ten tubes positioned in the loading buffer by conveyors 418. A vacuum is pulled on these suction cups, and pickup beam 422 is raised to lift the tubes from the input buffer conveyors. Loading crane 54 is then moved rightward into vertical alignment with vibratory loader 56, and beam 422 is lowered to place the tubes in requisite pre-loading positions defined by transversely spaced notches 425 provided in the upper edges of a series of transversely spaced rests 426, all as seen in FIG. 17b. The vacuum is broken to release the tubes, and the pickup beam is raised to clear the tube loading area.

After the tubes 44 have been fully loaded with multiple pellet zones of the various fuel types at the loading station, loading crane 54 is signalled to pick all ten tubes from the vibratory loader and place them in output buffer 62. This output buffer consists of a plurality of longitudinally spaced rests 428 having tube-positioning grooves 429 in their upper edges of the requisite spacing to accept the tubes transferred by crane 54. Preferably, these rests, or at least the tube-contacting portions thereof, as well as the other tube supporting surfaces in tube handling apparatus 48, are fashioned of a suitable material to preclude scratching of the tube surfaces.

Still referring to FIG. 17b once the loaded tubes or rods have been transferred to output buffer 62, output crane 66 is signalled into action. This crane, also riding on elevated rails 402, is automatically moved into vertical alignment with output buffer 62. The pickup beam 430 of this crane, unlike cranes 50 and 56, is equipped to handle only two rods at a time. Thus, this pickup beam carries longitudinally distributed sets of two suction cups 432 transversely spaced two rod output buffer positions apart. The output crane is controlled to pick accepted rods, singly or in pairs, from the output buffer and place them in programmed positions to orderly fill a tier of rods in the accepted rod tray 63 residing on a roller conveyor generally indicated at 434. Suspect rods are picked, singly or in pairs, in like fashion from the output buffer and placed in suspect rod tray 64 sitting on a roller conveyor, generally indicated at 436. It will be noted that the suction cups 432 of each set are coincidentially spaced five tray rod positions apart. Thus, output crane is capable, under computer control, to precisely place the rods in the proper positions in trays 63 and 64 to fill out each tier of rods stacked therein. As noted above, suspect rods are typically those whose end plug serial number was not properly read, those that experienced a jam during pellet loading, and those that failed the plenum length check.

FIG. 18 is representative of the mechanism for producing transverse horizontal motion of overhead cranes 50, 54 and 66. Thus each crane is equipped with linear bearings at each end, one illustrated at 440, which ride on common end rails 402. These rails are mounted by horizontal supports 442, each of which also mounts a gear rack 444. A drive shaft 446 extending the full length of the crane is journalled at spaced intervals by bearings 447 mounted by the frame 448 of the crane. A pinion gear 450 is mounted at each end of this shaft in meshing engagement with the gear rack 444 thereat. Bidirectional rotation of shaft 446 is introduced via a double-ended output gear box 451 driven by motor 452. It is thus seen that controlled energization of this motor drives pinion gears 450 in unison, and their meshing engagement with gear racks 444 propels the crane in transverse horizontal movement on rails 402.

Each crane 50, 54 and 66 is also equipped with a mechanism seen in FIG. 19 to raise and lower its pickup beam. Thus the frame 448 of each crane mounts a second, vertical drive motor 454 connected via a doubleended output gear box 456 to drive a longitudinally extending shaft 458 suitably journalled at spaced intervals. At appropriate points, such as adjacent each end and also at mid-length, frame 448 mounts a set of opposed rollers 460 for precisely controlling the vertical motion of a column 462 from which the pickup beam is suspended. Each of these columns carries a gear rack 463 which is engaged by a separate pinion gear 464 keyed to shaft 458. It is thus seen that unitary driven rotation of these pinion gears by motor 454 raises or lowers the pickup beam, depending on direction. Flexible boots 466 and caps 467 are provided as protective enclosures for the columns and the gears. While not shown, shaft 446 (FIG. 18) and shaft 458 (FIG. 19) also drive separate position encoders linked to the controller to accommodate control of the crane and beam movements and positions.

As seen in FIG. 20, optical character reader 52 is mounted to the system framework 180 on slides 470 and is reciprocated leftward by an air cylinder 472 into serial number reading relation with the end plug 45 of a cladding tube 44 held in its reading position against stops 413 (FIG. 17a) by a retractable clamp 474. The reader is equipped with a rotating scanning head (not shown) which looks for and reads the unique serial number engraved on the end plug. Mounted adjacent the optical character reader is a longitudinal tube aligning pad 476 which is reciprocated by an air cylinder 477 against the endplug tips of the tubes resting on conveyor 408 in input queue 51. A similar aligning pad (not shown), longitudinally opposed with pad 476, is concurrently reciprocated into engagement with the open ends of the tubes in the input queue to ensure transverse alignment of all of the tubes in the input queue.

Referring jointly to FIGS. 21 and 22, the longitudinally distributed tube rests 426 of the loading station are affixed to a plate 480 which, in turn, is slidingly mounted to bed 200 of vibratory loader 56 by opposed longitudinally elongated slide blocks 482. Underlying each tube-positioning notch 425 in these rests are openings 483 accommodating the extension therethrough of elongated manifolds 484. Each manifold mounts and is in fluid communication with a plurality of upstanding suction cups 486 distributed along its length. The manifolds are supported on plate 480 by springs 487 which bias the suction cups upwardly into pressure-sealing engagement with tubes 44 resting in notches 425.

As best seen in FIG. 22, a lead screw 490 is mounted by bearings 491 to the underside of vibratory loader bed 200, with a pulley 492 keyed to one end thereof being driven by a motor 493 via a drive pulley 494 and a timing belt 495. A position encoder 496, wired to the system controller, tracks the rotation of lead screw 490. A depending bracket 498, affixed to plate 480, carries a travelling nut 500 which is threaded onto this lead screw. Also affixed to this plate is an upright bracket 502 serving to mount a transverse array of air cylinders 504, one aligned with each of the ten tubes 44 seated on rests 426. The plunger of each air cylinder carriers a pad 505 which is reciprocated into engagement with the tips of tube end plugs 45 to longitudinally shift the tubes toward bushing apparatus 58.

When the full complement of ten tubes has been placed on rests 426 in their pre-loading positions by loading crane 54, motor 493 is energized to drive lead screw 490 and translate plate 480, as well as the tubes, leftward in FIG. 22 toward zone makeup machine 28. This motion brings the open ends of the tubes into proximate seating relation with bushing assembly 58, an event signalled by the interruption of the light beam between emitter 384 and receiver 385 (FIGS. 15 and 16). In response, air cylinders 504 are activated to individually drive the tubes into precise loading positions with their open ends in seated engagement with circumferential ledges 370 of the bushing assembly. A vacuum is pulled in the manifolds 484, and suction cups 486 effectively hold the tubes to plate 480. To ensure a tight suction grip on the tubes, the loading crane beam 422 is momentarily lowered to bear down on the tubes as the vacuum is pulled.

As seen in FIG. 21, an elongated retainer 510 of inverted J-shaped cross section is affixed to each slide block 482 in overhanging relation with each longitudinal border of plate 480. An elongated bladder 512, accommodated between each retainer and the plate, is pressurized to effectively clamp the plate to bed 200 of vibratory loader 56. Thus with the tubes in their loading positions being held down to the plate, and the plate held down to the bed, vibrators 202 (FIG. 6) can be activated to begin the loading of pellet zones through the bushing assembly and into the open tail ends of the tubes.

Once the tubes are fully loaded with pellets and the plenum length checked, bladder 512 is depressurized, and motor 493 is energized to withdraw the cladding tubes from their loading positions seated against ledges 370 to their pre-loading positions. The vacuum on suction cups 486 is broken to release the loaded tubes so that they can be transferred by the loading crane to output buffer 62.

It will be appreciated that while zone makeup machine 28 and tube handling apparatus 48 are equipped, in the illustrated embodiment, to handle complements of ten pellet rows and ten tubes at a time, rod loading system 20 of the invention can readily handle pellet row and tube complements of a lesser number.

It is seen from the foregoing, that the objects of the invention set forth above, including those made apparent from the preceding description, are efficiently attained, and, since certain changes may be made in the disclosed embodiment without departing from the scope of the invention, it is intended that all matters disclosed herein be taken as illustrative and not in a limiting sense.

Having described the invention, what is claimed as new and desired to secure by Letter Patent is:

1. In the manufacture of nuclear fuel rods containing multiple zones of fuel pellets of predetermined lengths and enrichments, an automated system for loading fuel pellets into cladding tubes comprising, in combination:
   A. a plurality of storage units, each storing trays carrying fuel pellets of known, different enrichments, each said tray bearing indicia uniquely identifying the enrichment of the pellets carried thereby, each said storage unit including a tray loading port and means for reading said tray indicia;
   B. a conveyor serving each said storage unit;
   C. cladding tube handling apparatus for arranging a plurality of cladding tubes in parallel pellet loading positions;
   D. a zone makeup machine for accepting successive trays of pellets delivered thereto by said conveyor from said storage units and making up pellets from each said tray into a separate group of pellet zones, each said group consisting of parallel rows of pellets of a specified length;
   E. a loader for concurrently loading said pellet rows in successive said pellet zone groups into the cladding tubes arranged in said loading positions; and
   F. a system controller for controlling tray access into said storage units through said loading ports in response to said tray indicia reading means such as to permit only said trays carrying pellets of a specified enrichment to be stored in each said storage unit and for controlling said conveyor such as to deliver said trays carrying pellets of specified enrichments to said zone makeup machine in proper sequence.

2. The system defined in claim 1, wherein said conveyor includes at least one trolley for transporting individual pellet trays from said storage units to said zone makeup machine as called for by said controller.

3. The system defined in claim 2, wherein said trolley includes additional means for reading said tray indicia upon retrieval of one of said pellet trays from the one of said storage units called for by said controller, thereby providing conformation that pellets of a specified enrichment are being delivered to said zone makeup machine by said conveyor.

4. The system defined in claim 3, wherein said zone makeup machine includes means for removing the pellets from the one of said trays transported thereto on said trolley pursuant to making up a group of said pellet zones and for returning excess pellet to the same one of said trays for transport by said trolley back to the one of said storage units from which it was retrieved.

5. The system defined in claim 4, wherein said storage units are in the form of elevators variously positioned along said conveyor, each said elevator including a vertical array of tray storage positions individually, horizontally alignable with said tray loading port, a tray unloading port with which said storage positions are individually horizontally alignable, and first ejector means for ejecting said pellet tray from the aligned one of said storage positions through said unloading port and out onto said trolley.

6. The system defined in claim 5, wherein said trolley includes second ejector means for ejecting a returned pellet tray of excess pellets thereon through said unloading port and into the aligned one of said storage positions of the one of said elevators from which it was retrieved.

7. The system defined in claim 6, which further includes an empty tray storage unit into which trays devoid of excess pellets are deposited by said second ejector means of said trolley.

8. The system defined in claim 5, wherein said zone makeup machine is positioned substantially at an intermediate point of said conveyor with said elevators positioned to each side of said intermediate point, said conveyor including two said trolleys, one for retrieving pellet trays from those of said elevators to one side of said intermediate point and the other for retrieving pellet trays from those of said elevators to the other side of said intermediate point.

9. The system defined in claim 1, wherein said zone makeup machine includes a longitudinally elongated bed, a stop selectively longitudinally positioned under the control of said controller, and carriage means for raking multiple parallel rows of pellets onto said bed from the one of said trays conveyed to said zone makeup machine by said conveyor and for concurrently measuring the lengths of said pellet rows backed up against said stop, said carriage means including means for gripping a pellet in each said row pursuant to separating the pellets into said group of pellet zones and a group of parallel rows of excess pellets, said carriage means operating under the control of said controller to rake said excess pellet group back onto said one pellet tray for return by said conveyor to the one of said storage units from which it was retrieved.

10. The system defined in claim 9, wherein said zone makeup machine further includes a scale for weighing each said pellet zone group prior to being loaded into the cladding tubes.

11. The system defined in claim 9, wherein said loader is a vibratory loader operating to vibrate said zone makeup machine bed and the cladding tubes in said loading positions.

12. The system defined in claim 11, wherein said zone makeup machine further includes a loading carriage equipped with sensing fingers for detecting a jamming condition encountered by anyone of said pellet rows of each said pellet zone group during loading thereof into the cladding tubes.

13. The system defined in claim 12, wherein said carriage means includes an input carriage and a zone makeup carriage, said zone makeup machine further includes rails for commonly mounting said input, zone makeup and loading carriages for longitudinal movement relative to said zone makeup machine bed.

14. The system defined in claim 12, wherein said loading carriage is further equipped with probes for concurrently measuring the lengths of the plenum chambers in the fully loaded cladding tubes.

15. The system defined in claim 14, which further includes a bushing assembly situated at the interface of said zone makeup machine and said cladding tube handling apparatus for promoting the smooth transition of said parallel rows of pellets of each said pellet zone group from said zone makeup machine into the cladding tubes in said loading positions.

16. The system defined in claim 15, wherein said bushing assembly includes a transverse array of bores through which said pellet rows of each said pellet zone group move in parallel from said zone makeup machine into the open ends of the cladding tubes, said bores terminating in annular seats against which the open ends of the cladding tubes are respectively abutted by said cladding tube handling apparatus to establish the cladding tubes in said loading positions.

17. The system defined in claim 16, wherein said bushing assembly further includes a shutter extending transversely of said bores and longitudinally offset from said annular seats, said shutter including a transverse array of holes through which the cladding tubes extend in said pellet loading positions.

18. The system defined in claim 17, wherein said bushing assembly further includes positioning means for positioning said shutter to align a reference surface thereof with said bores, said loading carriage being controlled by said controller to touch-off said probes against said shutter reference surface to calibrate a reference position for said loading carriage utilized in the measurements of the plenum chamber lengths.

19. The system defined in claim 1, wherein said cladding tube handling apparatus includes means for reading a unique serial number borne by each cladding tube, said reading means entering each cladding tube serial number into said controller.

20. The system defined in claim 19, wherein said cladding tube handling apparatus further includes first means for transferring en masse a predetermined number of cladding tubes from an input tube tray to an input queue, second means for transferring the cladding tubes from said input queue singularly to said serial number reading means enroute to accumulation in a loading buffer, and third means for transferring said predetermined number of cladding tubes en masse from said loading buffer to said loader for arrangement in said pellet loading positions.

21. The system defined in claim 20, wherein said loader is a vibratory loader.

22. The system defined in claim 21, wherein said tube handling apparatus further includes vacuum hold-down means for securing the cladding tubes to said vibratory loader.

23. The system defined in claim 21, wherein said vibratory loader includes a loader bed, a plurality of vibrators for mechanically vibrating said loader bed, a plurality of longitudinally distributed rests for supporting said predetermined number of cladding tubes in parallel, spaced pre-loading positions, a longitudinally elongated plate supporting said rests and in overlying relation with said loader bed, and positioning means for longitudinally shifting said predetermined number of cladding tubes endwise from said pre-loading positions toward said zone makeup machine to said pellet loading positions.

24. The system defined in claim 23, wherein said positioning means includes a linear translator for commonly shifting said predetermined number of cladding tubes from said pre-loading positions toward positions proximate said pellet loading positions and separate actuators for individually shifting the cladding tubes into said pellet loading positions.

25. The system defined in claim 24, wherein said linear translator varies the longitudinal position of said plate relative to said loader bed.

26. The system defined in claim 25, wherein said plate is slidingly mounted by said loader bed, and hold-down means for affixing said predetermined number of cladding tubes to said rests and said plate to said loader bed during pellet loading.

27. The system defined in claim 26, which further includes a bushing assembly situated at the interface of said zone makeup machine and said tube handling apparatus, said bushing assembly including a transverse array of bores through which said pellet rows of each pellet zone group respectively pass from said zone makeup machine into the open one ends of the cladding tubes, said bores terminating in annular seats against which the open ends of the cladding tubes are respectively individually seated by said actuators to establish said predetermined number of cladding tubes in said pellet loading positions.

28. The system defined in claim 27, wherein said zone makeup machine includes a loading mechanism equipped with sensing fingers for detecting a jamming condition encountered by any one of said pellet rows of each said pellet zone group during longitudinal advancement through said bushing assembly bores and into said predetermined number of cladding tubes, said loading mechanism further equipped with probes for concurrently measuring the lengths of the plenum chambers in the fully loaded cladding tubes.

29. The system defined in claim 28, wherein said bushing assembly further includes a shutter extending transversely of said bores and longitudinally offset from said annular seats, said shutter including a transverse array of holes through which the cladding tubes extend in said pellet loading positions.

30. The system defined in claim 20, wherein said third means of said tube handling apparatus further transfers said predetermined number of cladding tubes, once fully loaded with pellets, from said vibratory loader to an output buffer, and fourth means for selectively transferring acceptable cladding tubes from said output buffer to a first output tray and suspect cladding tubes from said output buffer to a second output tray.

31. The system defined in claim 30, wherein said first, third and fourth means of said cladding tube handling apparatus are separate overhead cranes mounted for separately controlled horizontal movements, each said crane including a vertically reciprocating beam equipped with longitudinally distributed suction cups for attachment to the cladding tubes.

32. In the manufacture of nuclear fuel rods, an automated system for loading fuel pellets into cladding tubes, said system comprising, in combination:

A. plural storage units, each storing trays of fuel pellets of different enrichments;

B. a tray conveyor;

C. cladding tube handling apparatus for arranging a predetermined number of cladding tubes in predetermined parallel pellet loading positions, said apparatus including
   (1) a reader for reading a number borne by each cladding tube,
   (2) first tube handling means for transferring en masse said predetermined number of cladding tubes from an input tray to an input queue,
   (3) second tube handling means for transferring the cladding tubes from said input queue singularly to said reader enroute to accumulation in a loading buffer,
   (4) third tube handling means for transferring said predetermined number of cladding tubes en masse from said loading buffer to said pellet loading positions and, once fully loaded with pellets, en masse from said pellet loading positions to an output buffer,
   (5) fourth tube handling means for selectively transferring acceptable cladding tubes from said output buffer to a first output tray and suspect cladding tubes from said output buffer to a second output tray, and
   (6) said first, third and fourth tube handling means are separate overhead cranes mounted for separately controlled horizontal movements, each said crane including a vertically reciprocating beam equipped with a distributed array of suction cups for attachment to the cladding tubes;

a zone makeup machine including
   (1) an input station to which trays of fuel pellets of known, different enrichments are successively conveyed by said tray conveyor from selected said storage units,
   (2) a longitudinally elongated loading surface having a plurality of parallel, spaced, longitudinally extending grooves, and
   (3) carriage means for raking parallel rows of pellets from each tray at said input station onto said loading surface for advancement in said grooves for making up from the pellet rows in said grooves a corresponding plurality of zones of multiple pellets, each to a predetermined, substantially common zone length;

E. a vibratory loader for concurrently loading said plurality of pellet zones from said loading surface into said predetermined number of cladding tubes arranged in said loading positions; and F. a central controller for automatically controlling the operations of said tray conveyor, said tube handling apparatus, said zone makeup machine, and said vibratory loader.

33. The system defined in claim 32, wherein said zone makeup machine further includes a retractable stop selectively, longitudinally positioned over said loading surface, said carriage means separating each of said pellet rows as backed up against said stop into a pellet row of said predetermined zone length and a pellet row of excess pellets, said carriage means raking said excess pellet rows in parallel from said loading surface grooves back onto the tray waiting at said input station for return by said tray conveyor back to the selected one of said storage units from which it was retrieved.

34. The system defined in claim 33, wherein each said pellet tray carries indicia identifying the enrichment concentration of the fuel pellets thereon, each said storage unit including means linked with said central controller for reading said tray indicia and a loading port, said central controller operating in response to the reading of said tray indicia by said reading means to limit access to said storage units through said loading ports to only those trays bearing fuel pellets of the particular enrichment concentration designated for storage therein.

35. The system defined in claim 34, wherein said tray conveyor includes additional means linked with said controller for reading said tray indicia upon retrieval from said selected one of said storage units to provide verification that a tray of pellets of the particular enrichment concentration called for by said controller has been retrieved for conveyance to said zone makeup machine, said additional means also reading said tray indicia borne by a tray of excess pellets to provide verification that said excess pellet tray is being returned by said tray conveyor to the said selected one of said storage units from which it was retrieved.

36. The system defined in claim 33, wherein said carriage means of said zone makeup machine comprises an input carriage mounted for longitudinal movement under the control of said controller, said input carriage including a transverse array of separate depending raking fingers respectively aligned with said loading surface grooves for raking parallel pellet rows from a tray presented to said input station onto said loading surface and for raking parallel rows of excess pellets from said loading surface back onto a tray waiting at said input station.

37. The system defined in claim 36, wherein said input carriage further includes a separate sensor associated with each said raking finger for detecting a jamming condition encounted by the one of said pellet rows being raked thereby, said controller operating in response to said sensors to halt raking motion of said input carriage in the event of a jamming condition.

38. The system defined in claim 36, wherein said input carriage includes means individually mounting said raking fingers for selective vertical movement into and out of raking relation with said pellet rows.

39. The system defined in claim 33, wherein said carriage means of said zone makeup machine comprises a zone makeup carriage mounted for longitudinal movement under the control of said controller, said zone makeup carriage including a transverse array of gripper fingers arranged to separately engage a fuel pellet in each said pellet row pursuant to effecting the separation of each said pellet row into said pellet row of predetermined zone length and said row of excess pellets.

40. The system defined in claim 39, wherein said zone makeup carriage further includes a transverse array of measuring fingers respectively engageable with said pellet rows backed up against said stop to determine if the lengths thereof are within acceptable limits of said predetermined zone length.

41. The system defined in claim 40, wherein said zone makeup carriage further includes means separately mounting said measuring fingers for independent longitudinal movement and vertical movement into and out of length measuring relation with said pellet rows.

42. The system defined in claim 41, wherein said zone makeup carriage includes a position encoder for indicating to said controller the longitudinal position of said zone makeup carriage relative to said stop and separate linear position sensors for indicating to said controller the position of each said measuring finger relative to a common reference position on said zone makeup carriage, thereby enabling said controller to determine the zone length of each said pellet row backed up against said stop.

43. The system defined in claim 40, wherein said system further includes a scale for commonly weighing said pellet rows of said predetermined zone lengths.

44. The system defined in claim 33, wherein said zone makeup machine further includes a loading carriage mounted for longitudinal movement under the control of said controller, said loading carriage including a transverse array of depending sensing fingers arranged to trail the loading longitudinal movements of said pellet zone in each said loading surface groove induced by said vibratory loader and to signal said controller in the event any one of said pellet zones encounters a jamming condition.

45. The system defined in claim 44, wherein said loading carriage further includes means for mounting said sensing fingers for independent longitudinal movement and for independent vertical movement into and out of jam sensing relation with said rows of pellet zones.

46. The system defined in claim 44, wherein said loading carriage further includes a transverse array of depending probes arranged to enter fully loaded cladding tubes and distance measuring means for concurrently measuring the plenum chamber length existing in each cladding tube.

47. The system defined in claim 46, which further includes a bushing assembly having a transverse array of longitudinally extending bores through which said pellet zones respectively pass from said loading surface into the cladding tubes in said loading positions.

48. The system defined in claim 44, wherein said tube handling apparatus further includes vacuum hold-down means for securing the cladding tubes to said vibratory loader.

49. The system defined in claim 44, wherein said vibratory loader includes a loader bed, a plurality of vibrators for mechanically vibrating said loader bed, a plurality of longitudinally distributed rests for supporting said predetermined number of cladding tubes in parallel, spaced pre-loading positions, a longitudinally elongated plate supporting said rests in overlying relation with said loader bed, and positioning means for longitudinally shifting said predetermined number of cladding tubes endwise from said pre-loading positions toward said zone makeup machine to said pellet loading positions.

50. The system defined in claim 49, wherein said positioning means includes a linear translator for commonly shifting said predetermined number of cladding tubes from said pre-loading positions toward positions proximate said pellet loading positions and separate actuators for individually shifting the cladding tubes into said pellet loading positions.

51. The system define in claim 50, wherein said plate is slidingly mounted by said loader bed, and hold-down means for affixing said predetermined number of cladding tubes to said rests and said plate to said loader bed during pellet loading.

* * * * *